United States Patent
Choi et al.

(10) Patent No.: US 9,870,160 B2
(45) Date of Patent: Jan. 16, 2018

(54) METHOD OF OPERATING MEMORY SYSTEM INCLUDING NONVOLATILE MEMORY AND MEMORY CONTROLLER

(71) Applicant: SAMSUNG ELECTRONICS CO., LTD., Suwon-si, Gyeonggi-do (KR)

(72) Inventors: In-Hwan Choi, Hwaseong-si (KR); ByungJune Song, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 256 days.

(21) Appl. No.: 14/669,542

(22) Filed: Mar. 26, 2015

(65) Prior Publication Data
US 2015/0277795 A1    Oct. 1, 2015

(30) Foreign Application Priority Data
Mar. 26, 2014    (KR) .................. 10-2014-0035142

(51) Int. Cl.
*G06F 3/06*    (2006.01)

(52) U.S. Cl.
CPC .......... *G06F 3/0619* (2013.01); *G06F 3/064* (2013.01); *G06F 3/0616* (2013.01); *G06F 3/0652* (2013.01); *G06F 3/0655* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 6,684,288 B1 | 1/2004 | Jacobs | |
| 7,061,812 B2 | 6/2006 | Shinagawa et al. | |
| 7,117,402 B2 | 10/2006 | DiZenzo et al. | |
| 7,391,654 B2 | 6/2008 | Aritome | |
| 7,515,500 B2 | 4/2009 | Ahvenainen et al. | |
| 7,564,721 B2 | 7/2009 | Roohparvar | |
| 7,975,119 B2 | 7/2011 | Erez | |
| 2007/0136555 A1* | 6/2007 | Sinclair | G06F 3/0605 711/203 |
| 2010/0023677 A1 | 1/2010 | Shin et al. | |
| 2010/0077266 A1* | 3/2010 | Kanno | G06F 11/1068 714/704 |
| 2011/0022784 A1* | 1/2011 | Yano | G06F 12/0246 711/103 |
| 2013/0007343 A1* | 1/2013 | Rub | G06F 12/0246 711/103 |
| 2013/0051144 A1* | 2/2013 | Suzuki | G06F 3/0616 365/185.11 |

FOREIGN PATENT DOCUMENTS

| | | |
|---|---|---|
| JP | 2001-318829 | 11/2001 |
| JP | 2008-146742 | 6/2008 |
| JP | 2010-205167 | 9/2010 |

\* cited by examiner

Primary Examiner — Yaima Rigol
(74) Attorney, Agent, or Firm — F. Chau & Associates, LLC

(57) ABSTRACT

A method of operating a nonvolatile memory (NVM) is provided which includes calculating an assignment interval between successive assignments of erase blocks to free blocks from among a plurality of memory blocks of the NVM, and adjusting a number of erase blocks of the plurality of memory blocks according to the assignment interval. The erase blocks are memory blocks, having an erased state, from among the plurality of memory blocks, and the free blocks are memory blocks, which are selected to write data, from among the erase blocks.

20 Claims, 19 Drawing Sheets

METHOD OF OPERATING MEMORY SYSTEM INCLUDING NONVOLATILE MEMORY AND MEMORY CONTROLLER

CROSS-REFERENCE TO RELATED APPLICATIONS

A claim for priority under 35 U.S.C. §119 is made to Korean Patent Application No. 10-2014-0035142 filed on Mar. 26, 2014, in the Korean Intellectual Property Office, the disclosure of which is incorporated by reference herein.

BACKGROUND

Technical Field

The inventive concepts described herein relate to a semiconductor memory, and more particularly, relate to an operation method of a memory system that contains a nonvolatile memory and a memory controller.

Discussion of Related Art

A semiconductor memory device is a memory device which is fabricated using semiconductors such as silicon (Si), germanium (Ge), gallium arsenide (GaAs), indium phosphide (InP), and so on. Semiconductor memory devices are divided into volatile memory devices and nonvolatile memory devices.

The volatile memory devices may lose stored contents at power-off. The volatile memory devices include a static RAM (SRAM), a dynamic RAM (DRAM), a synchronous DRAM (SDRAM), and the like. The nonvolatile memory devices may retain stored contents even at power-off. The nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and so on.

Some nonvolatile memories have an erase-before-write characteristic, which means that before data can be written into a location with previously written data, the previously written data needs to be erased. For example, a flash memory may have the erase-before-write characteristic. However, the operation performance of the memory device may decrease when the erasing performed before an overwrite takes a long time.

SUMMARY

An exemplary embodiment of the inventive concept provides a method of operating a nonvolatile memory (NVM) of a memory system. The method includes calculating an assignment interval between successive assignments of erase blocks to free blocks from among a plurality of memory blocks of the NVM; and adjusting a number of erase blocks of the plurality of memory blocks according to the assignment interval, wherein the erase blocks are memory blocks, having an erased state, from among the plurality of memory blocks, and wherein the free blocks are memory blocks, which are selected to write data, from among the erase blocks.

In an exemplary embodiment, the assignment interval is calculated from a predetermined number of most recent assignments of the free blocks.

In an exemplary embodiment, the adjusting decreases the number of the erase blocks according to an increase in the assignment interval.

In an exemplary embodiment, the adjusting increases the number of the erase blocks according to a decrease in the assignment interval.

In an exemplary embodiment, the method further includes storing a time stamp when an invalid block is erased to generate a second erase block, wherein the invalid block is a memory block, which stores invalid data and is generated by invalidating a data block, from among the plurality of memory blocks, and wherein the time stamp indicates a time when the second erase block is generated.

In an exemplary embodiment, the method further includes re-erasing the second erase block according to the time stamp.

In an exemplary embodiment, the second erase block is re-erased when a difference between a time, indicated by the time stamp, and a current time is over a threshold value.

In an exemplary embodiment, the current time indicates a time when a request of an assignment of an erase block to a free block has been issued.

In an exemplary embodiment, the re-erased second erase block is assigned to the free block according to the request.

In an exemplary embodiment, a third erase block different from the re-erased second erase block is assigned to the free block according to the request.

An exemplary embodiment of the inventive concept provides an operation method of a memory system which includes a nonvolatile memory including a plurality of memory blocks; and a memory controller controlling the nonvolatile memory, the operation method comprising storing a time stamp when erasing an invalid block to generate an erase block; and re-erasing the erase block according to the time stamp, wherein the time stamp indicates a time when the erase block is generated, wherein the invalid block is a memory block, which stores invalid data, from among the plurality of memory blocks, and wherein the erase block is a memory block, having an erased state, from among the plurality of memory blocks.

In an exemplary embodiment, the erase block is re-erased when a difference between a time, indicated by the time stamp, and a current time is over a threshold value.

In an exemplary embodiment, the current time indicates a time when there is issued a request indicating an assignment of the erase block to a free block, and the free block is a memory block, which does not store data and is selected to store data, from among erase blocks of the plurality of memory blocks.

In an exemplary embodiment, the re-erased erase block is assigned to the free block according to the request.

In an exemplary embodiment, an erase block different from the re-erased erase block is assigned to the free block according to the request.

In an exemplary embodiment, the time stamp is mapped so as to be stored together with an address of the erase block.

An exemplary embodiment of the inventive concept provides a method of operating a nonvolatile memory (NVM) of a memory system. The method includes: calculating, by a memory controller of the memory system, an assignment interval between generation of an erase block to an assignment of the erase block to a free block from among a plurality of memory blocks of the NVM; and adjusting, by the memory controller, a number of erase blocks of the plurality of memory blocks according to the assignment interval. In an embodiment, the erase block the assignment interval is calculated from is the erase block that was most recently assigned to a free block.

An exemplary embodiment of the inventive concept provides a method of operating a nonvolatile memory (NVM)

of a memory system. The method includes: selecting, by a memory controller of the memory system, a current erase block from among a plurality of erase blocks in response to a request for a free block; calculating, by the memory controller, an elapsed time based on a timestamp associated with the currently selected erase block; and assigning, by the memory controller, the selected erase block as the free block when the elapsed time does not exceed a threshold time. In an embodiment, the method includes selecting a new one of the erase blocks as the current erase block when the elapsed time exceeds the threshold and re-executing the prior steps. In an embodiment, when the elapsed time exceeds the threshold, the method includes setting the currently selected erase block to an invalid block storing invalid data. In an embodiment, the timestamp is a time at which an invalid block storing invalid data is erased to generate the currently selected erase block.

With embodiments of the inventive concept, erase blocks may be produced before a free block is requested. Then a free block can be instantly assigned without performing an erase operation when a free block is requested. Accordingly, the speed of a memory system may be improved.

Further, a re-erasing of an erase block according to embodiments of the inventive concept may prevent an error from occurring at an erase block when a long time elapses after the erase block is erased, thereby improving the reliability of the memory system.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
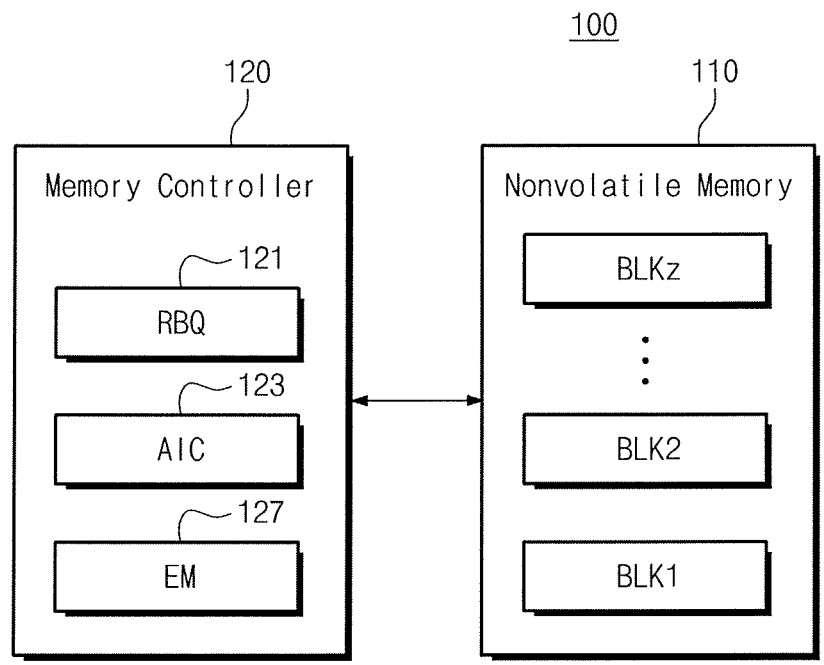
FIG. 1 is a block diagram schematically illustrating a memory system according to an exemplary embodiment of the inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. Unless otherwise noted, like reference numerals denote like elements throughout the attached drawings and written description, and thus descriptions will not be repeated. In the drawings, the sizes and relative sizes of layers and regions may be exaggerated for clarity.

It will also be understood that when a layer is referred to as being "between" two layers, it can be the only layer between the two layers, or one or more intervening layers may also be present. As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is a block diagram schematically illustrating a memory system 100 according to an exemplary embodiment of the inventive concept. Referring to FIG. 1, a memory system 100 contains a nonvolatile memory 110 and a memory controller 120.

The nonvolatile memory 110 is configured to perform write, read, and erase operations according to a control of the memory controller 120. The nonvolatile memory 110 includes a plurality of memory blocks BLK1 to BLKz, where each memory block includes a plurality of memory cells capable of storing data. A memory block may form an erase unit. For example, an erase operation of the nonvolatile memory 110 is performed by a unit of the memory block. For example, even if only a part of a memory block needs to be overwritten, the entire memory block is erased before that part can be written. Memory cells in the same memory block may be erased at the same time. Memory cells in different memory blocks may be erased in turn.

Each of the memory blocks may be a data block, an invalid block, an erase block, or a free block. In an embodiment, the data block is a memory block with valid data or invalid data. In an embodiment, the invalid block is a memory block in which only invalid data (e.g., invalidated data) is stored. The invalid block may be a memory block that is invalidated. In an embodiment, the erase block does not store data and is a memory block having memory cells with erase states. The erase block may be generated by erasing the invalid block. In an embodiment, the free block has a state in which data is not stored and is a memory block that is capable of being selected as the data block. The free block may be assigned from the erase block. The invalid and erase blocks may be referred to as reserved blocks.

The memory controller 120 is configured to control the nonvolatile memory 110. The memory controller 120 controls a read, write, or erase operation of the nonvolatile memory 110 according to a request of an external device (e.g., a host of the memory system 100) or an internal schedule. The memory controller 120 contains a reserved block queue 121, an assignment interval calculator 123, and an erase manager 127.

The reserved block queue 121 manages reserved blocks of the plurality of memory blocks BLK1 to BLKz. If an invalid block is produced by invalidating a data block, then the invalid block that is produced is registered at the reserved block queue 121. If an erase block is assigned to a free block, in an embodiment, the erase block that is assigned to the free block is deleted from the reserved block queue 121.

The assignment interval calculator 123 is configured to calculate an interval between times that free blocks are assigned from erase blocks. Hereinafter, the interval is referred to as an assignment interval. In an exemplary embodiment, the assignment interval calculator 123 calculates an interval (or an average interval of intervals) between assignments of two continuous free blocks from among two or more erase blocks which are most recently assigned to free blocks. In an embodiment, the assignment interval calculator 123 calculates an interval (e.g., an average interval) of times that two continuous free blocks are assigned from among a set number of free blocks which are most recently assigned. In an embodiment, the interval is the time between generation of an erase block to its assignment as a free block. The assignment interval that the assignment interval calculator 123 calculates may include time information.

The erase manager 127 erases invalid blocks registered at the reserved block queue 121 to make erase blocks. The erase manager 127 carries out an erase operation based on the assignment interval that the assignment interval calculator 123 calculates. The erase manager 127 manages a set number of erase blocks. In an embodiment, the set number of erase blocks indicates a set value that the number of erase blocks of memory blocks registered at the reserved block queue 121 is allowed to reach. The number of erase blocks decreases when an erase block of the reserved block queue 121 is assigned to a free block and the number of erase blocks increases when an invalid block of the reserved block queue 121 is erased. For example, the erase invalid block becomes a new erase block. If the number of erase blocks of the reserved block queue 121 is less than a set number, then the erase manager 127 erases an invalid block(s) to increase the number of erase blocks. In contrast, the erase manager 127 does not erase an invalid block(s) when the number of erase blocks of the reserved block queue 121 is equal to or more than the set number. That is, the erase manager 127 manages the erase blocks such that the number of the erase blocks is maintained at the set number of erase blocks. In an exemplary embodiment, the set number of erase blocks is adjusted by an external device or according to a signal that the external device provides. For example, a default value of the set number of erase blocks is decided according to an external control and adjusted according to a method which will be described later.

Figure 2:
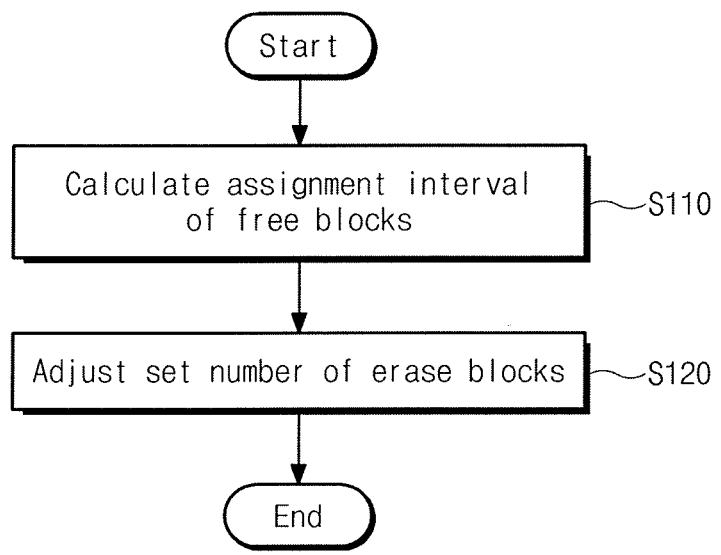
FIG. 2 is a flow chart schematically illustrating an operation method of a memory system according to an exemplary embodiment of the inventive concept.

FIG. 2 is a flow chart schematically illustrating an operation method of a memory system 100 according to an exemplary embodiment of the inventive concept. Referring to FIGS. 1 and 2, in step S110, an assignment interval of free blocks is calculated. An assignment interval calculator 123 calculates the assignment interval (e.g., an average assignment interval) that two continuous free blocks are assigned from erase blocks among two or more erase blocks which are most recently assigned to free blocks. For example, if two continuous erase blocks were recently assigned to free blocks, and it took the first erase block one microsecond to transition to a free block and the second erase block two microseconds to transition to a free block, the average assignment interval would be one and a half microseconds.

In step S120, the set number of erase blocks is adjusted. For example, an erase manager 127 adjusts the set number of erase blocks according to the assignment interval. That is, the erase manager 127 adjusts the number of memory blocks that are maintained as erase blocks in a reserved block queue 121.

Figure 3:
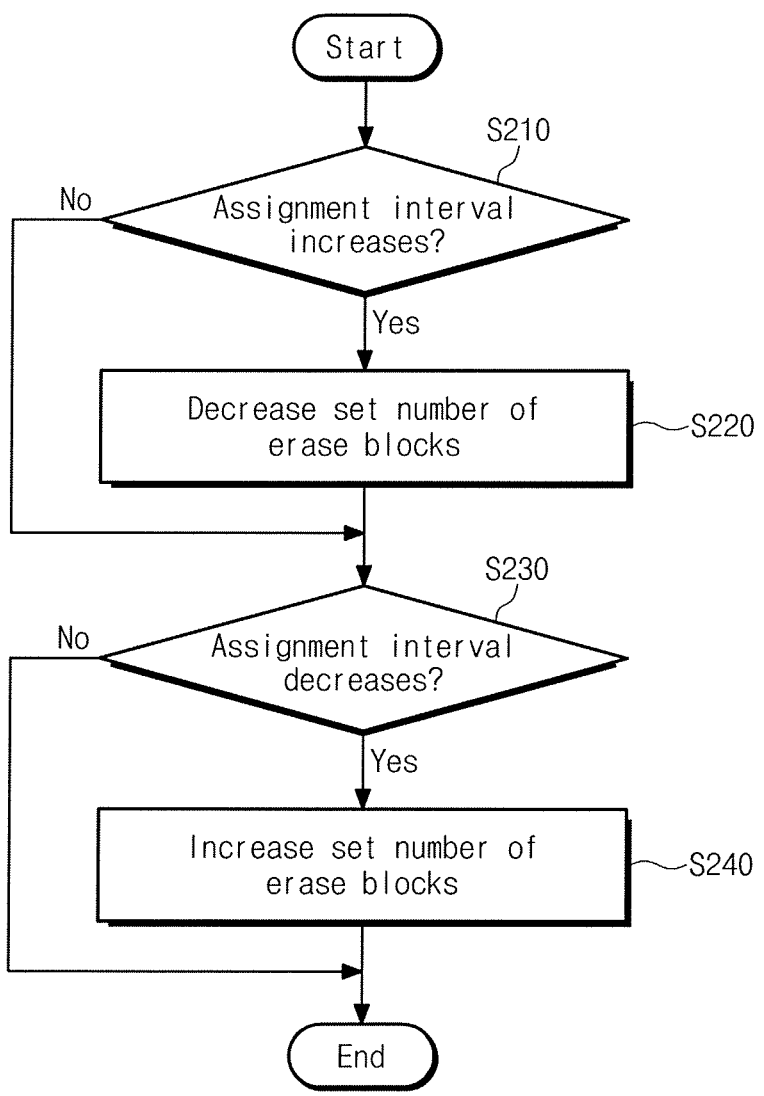
FIG. 3 is a flow chart schematically illustrating a method (S120) of adjusting a set number of erase blocks according to an exemplary embodiment of the inventive concept.

FIG. 3 is a flow chart schematically illustrating a method (S120) of adjusting a set number of erase blocks according to an exemplary embodiment of the inventive concept. Referring to FIGS. 1 and 3, in step S210, whether an assignment interval increases is determined. For example, a previously calculated assignment interval can be compared against the newly calculated assignment interval to determine whether the assignment interval has increased. If the assignment interval has increased, in step S220, the set number of erase blocks decreases. That is, there is a decrease in the number of memory blocks that are maintained as erase blocks in a reserved block queue 121.

In step S230, whether the assignment interval decreases is determined. If the assignment interval has decreased, in step S240, the set number of erase blocks increases. That is, there is an increase in the number of memory blocks that are maintained as erase blocks in the reserved block queue 121. If the assignment interval is the same as it was previously, the method is ended.

Figure 4:
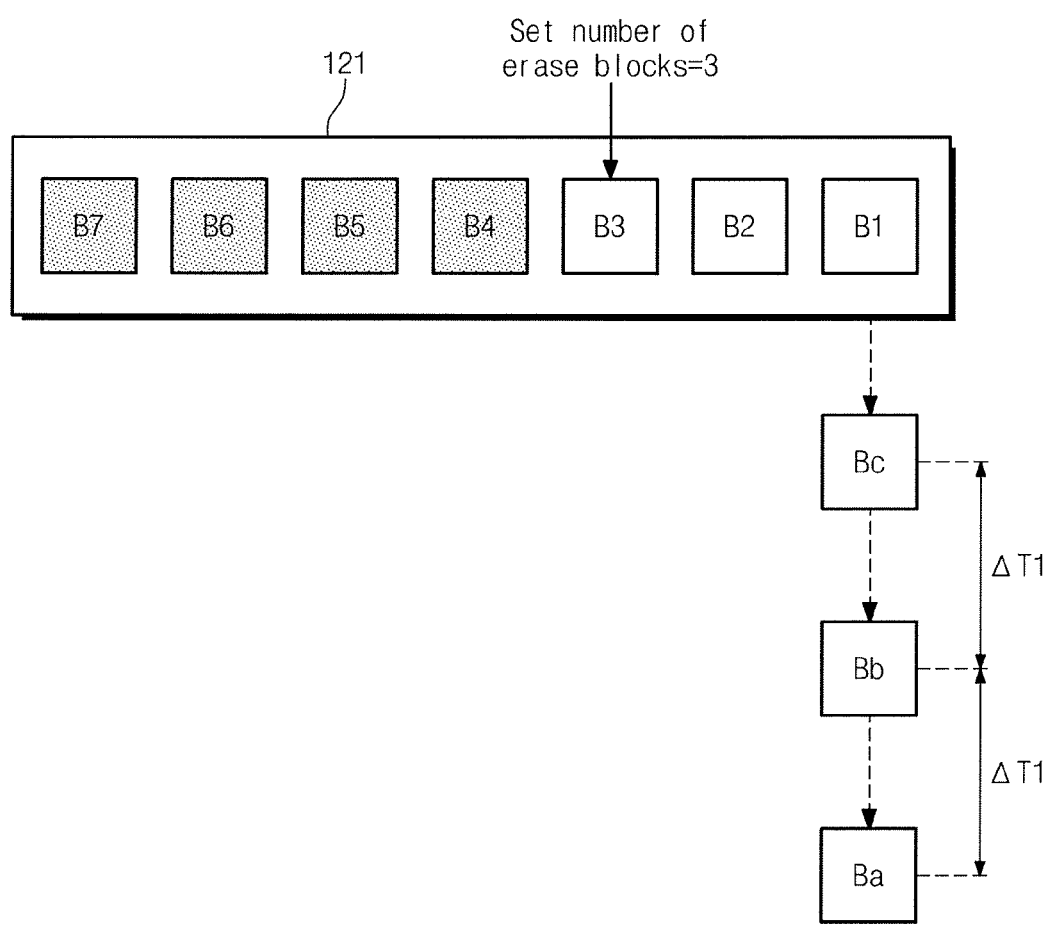
FIGS. 4 to 6 are diagrams schematically illustrating examples in which the set number of erase blocks is adjusted.
Figure 5:
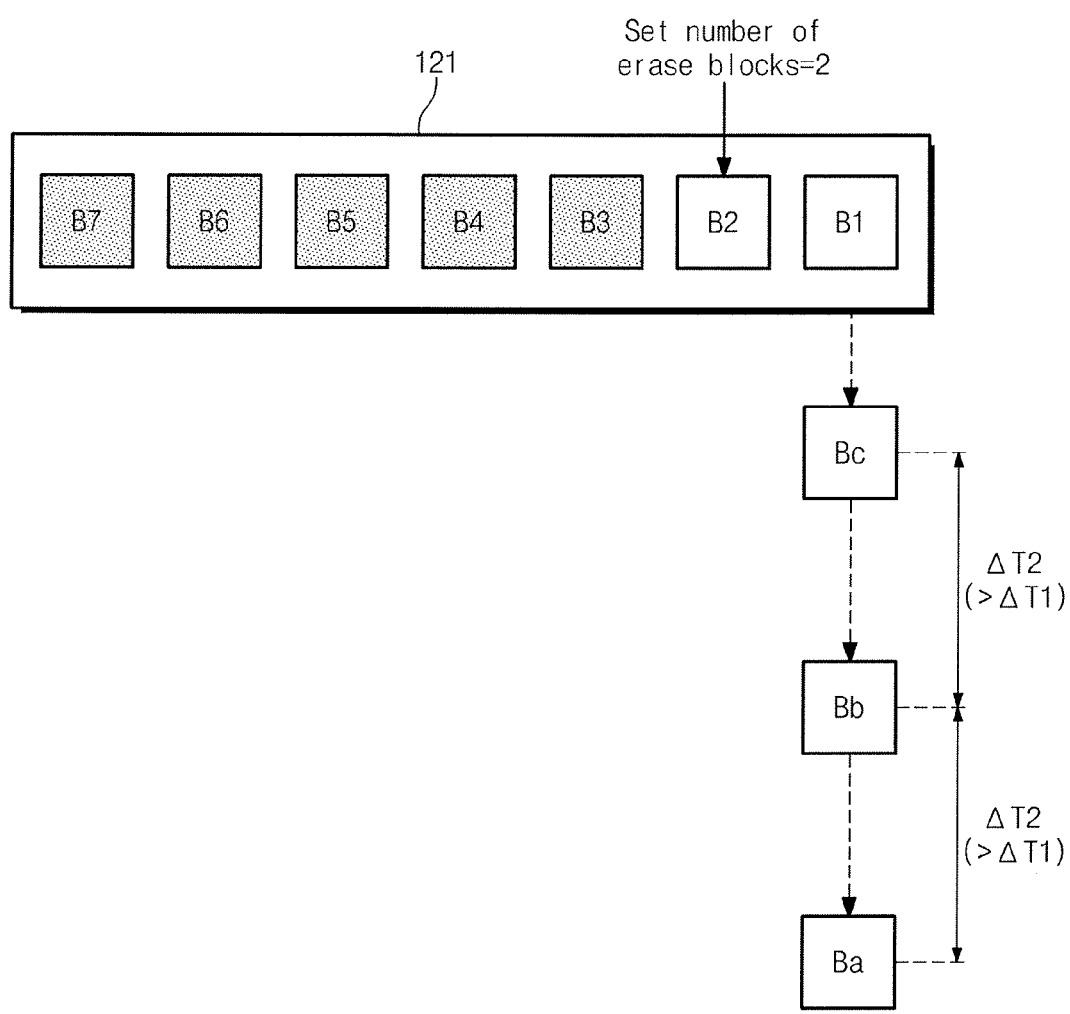
Figure 6:
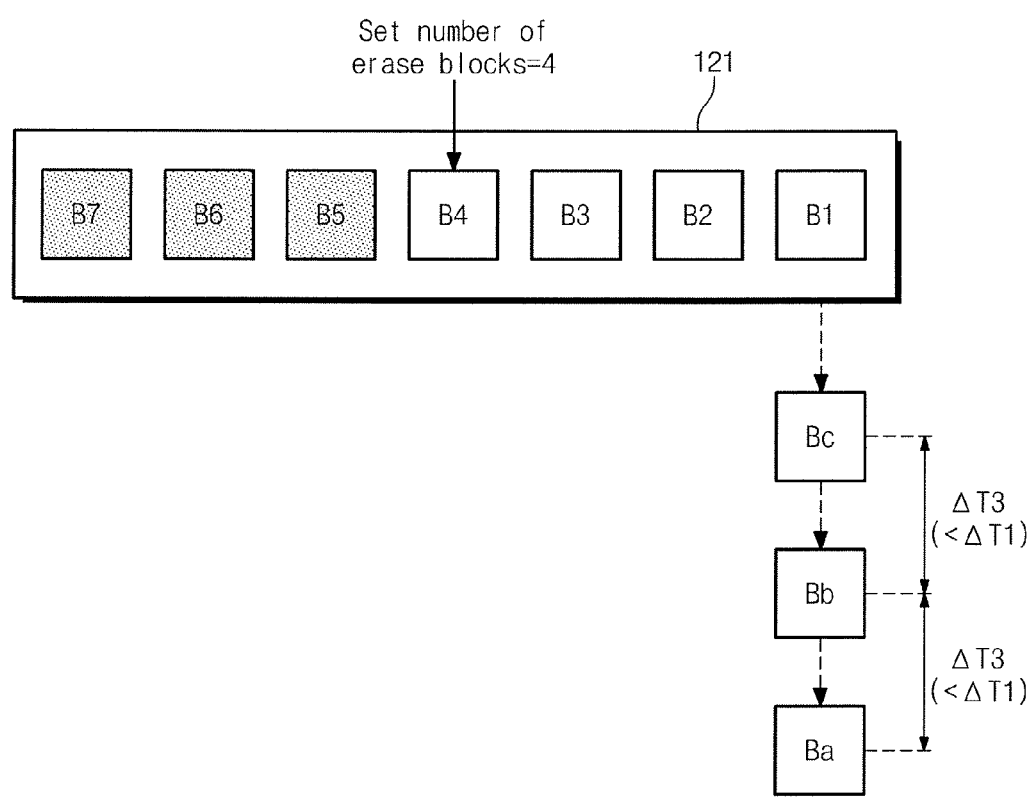

FIGS. 4 to 6 are diagrams schematically illustrating examples in which the set number of erase blocks is adjusted. Seven memory blocks B1 to B7 are registered at a reserved block queue 121. Memory blocks Ba, Bb, and Bc are memory blocks that are most recently assigned to free blocks. An assignment interval of the memory blocks Ba to Bc is a first assignment interval ΔT1. At this time, the set number of erase blocks in the reserved block queue 121 may be 3. That is, three earliest registered memory blocks B1 to B3 of seven memory blocks B1 to B7 registered at the reserved block queue 121 are maintained as erases blocks. All the memory blocks B4 to B7 other than the memory blocks B1 to B3 are not erased and maintained as invalid blocks. If an erase block of the reserved block queue 121 is assigned to a free block, then an invalid block is erased to maintain the set number of erase blocks. For example, an invalid block may be erased during an idle time or a background operation of a memory system 100. In an exemplary embodiment, the background operation includes operations for managing the memory system except main operations such as a read operation and a write operation. The background operation may include erasing invalid blocks to match the number of erase blocks with the set number.

In FIG. 4, the first assignment interval ΔT1 with which free blocks Ba to Bc are assigned is illustrated as being constant. However, the inventive concept is not limited thereto. The first assignment interval ΔT1 may be an average assignment interval of most recently assigned free blocks Ba, Bb, and Bc. For example, the first assignment interval ΔT1 may be a weighted average assignment interval of most recently assigned free blocks Ba, Bb, and Bc. For example, a weight may be an inverse proportion to a time which elapses after an erase block is assigned to a free block. In other words, a first weight of the most recently assigned free block has a relatively greater value than a second weight of a free block assigned in advance.

Referring to FIGS. 1, 4, and 5, the assignment interval of the memory blocks Ba to Bc is a second assignment interval ΔT2. The second assignment interval ΔT2 is longer than the first assignment interval ΔT1. For example, an assignment interval changes to the second assignment interval ΔT2 from the first assignment interval ΔT1. The set number of erase blocks decreases in proportion to an increase in an assignment interval. For example, the set number of erase blocks may be 2. That is, two earliest registered memory blocks B1 and B2 of the memory blocks B1 to B7 registered at the reserved block queue 121 are erased and maintained as erase blocks. All the memory blocks B3 to B7 other than the memory blocks B1 and B2 are not erased and maintained as invalid blocks.

Invalid blocks are not erased when the number of erase blocks is more than the set number of erase blocks. When a free block is assigned, the number of erase blocks may decrease. That is, when the set number of erase blocks decreases, the number of erase blocks is decreased to the set number by not erasing invalid blocks. Once the number of erase blocks reaches the set number, the number of erase blocks is kept with the set number. For example, if an erase block of the reserved block queue 121 is assigned to a free block, then an invalid block is erased to maintain the set number of erase blocks. In an exemplary embodiment, an invalid block is erased during an idle time or a background operation of a memory system 100. During an idle time or a background operation of a memory system 100, invalid blocks may be sequentially erased until the number of erase blocks reaches the set number.

In FIG. 5, the second assignment interval ΔT2 with which the free blocks Ba to Bc are assigned is illustrated as being constant. However, the inventive concept is not limited thereto. The second assignment interval ΔT2 may be an average assignment interval of most recently assigned free blocks Ba, Bb, and Bc. For example, the second assignment interval ΔT2 may be a weighted average assignment interval of most recently assigned free blocks Ba, Bb, and Bc. For example, a weight may be an inverse proportion to a time which elapses after an erase block is assigned to a free block. In other words, a first weight of the most recently assigned free block has a relatively greater value than a second weight of a free block assigned in advance.

Referring to FIGS. 1, 4, and 6, the assignment interval of the memory blocks Ba to Bc is a third assignment interval ΔT3. The third assignment interval ΔT3 is shorter than the first assignment interval ΔT1. For example, an assignment interval changes to the third assignment interval ΔT3 from the first assignment interval ΔT1. The set number of erase blocks increases in proportion to a decrease in an assignment interval. For example, the set number of erase blocks may be 4. That is, four earliest registered memory blocks B1 to B4 of the memory blocks B1 to B7 registered at the reserved block queue 121 are erased and maintained as erase blocks. All the memory blocks B5 to B7 other than the memory blocks B1 to B4 are not erased and maintained as invalid blocks.

When the number of erase blocks is less than the set number, invalid blocks are erased. That is, the number of erase blocks increases by making erase blocks. Once the number of erase blocks reaches the set number, the number of erase blocks is maintained at the set number. For example, if an erase block of the reserved block queue 121 is assigned to a free block, then an invalid block is erased to maintain the number of erase blocks at the set number.

In FIG. 6, the third assignment interval ΔT3 with which the free blocks Ba to Bc are assigned is illustrated as being constant. However, the inventive concept is not limited thereto. The third assignment interval ΔT3 may be an average assignment interval of most recently assigned free blocks Ba, Bb, and Bc. For example, the third assignment interval ΔT3 may be a weighted average assignment interval of most recently assigned free blocks Ba, Bb, and Bc. For example, a weight may be an inverse proportion to a time which elapses after an erase block is assigned to a free block. In other words, a first weight of the most recently assigned free block has a relatively greater value than a second weight of a free block assigned in advance.

As described above, erase blocks are maintained in the reserved block queue 121 as many as the set number. When a free block is required, an erase block in the reserved block queue 121 may be assigned to a free block without erasing an invalid block. For example, after an erase block has been assigned to a free block, if the assignment interval has changed to be consistent with this new lower erase block count, it would not be necessary to erase another invalid block. This may mean that an erase operation is not performed when a free block is required. Thus, it is possible to improve the speed of the memory system 100.

States of memory cells of an erase block may vary with lapse of time. For example, states (e.g., a threshold voltage) of memory cells may vary according to a characteristic of data retention. Also, a disturbance may occur at an erase block because a memory block adjacent to the erase block is read or programmed. When states of memory cells vary over a critical value, an error may occur when data is written in an erase block assigned to a free block or written data is read therefrom.

With an embodiment of the inventive concept, the number (i.e., set number) of erase blocks maintained in the reserved block queue 121 may be adjusted according to an assignment interval with which free blocks are assigned. The reliability of the memory system 100 may be improved by preventing an error that occurs when an erase block leaves during a critical time.

In exemplary embodiments, a default value or an initial value of the set number is stored in a memory controller 120 or a nonvolatile memory 110. For example, the memory controller 120 may store a default value or an initial value of the set number in a nonvolatile storage medium such as ROM. Where a default value or an initial value of the set number is stored in the nonvolatile memory 110, the memory controller 120 reads the default value or initial value of the set number from the nonvolatile memory 110 at power-on. Or, a default value or an initial value of the set number may be decided by an external device or according to a signal that is received from the external device.

Figure 7:
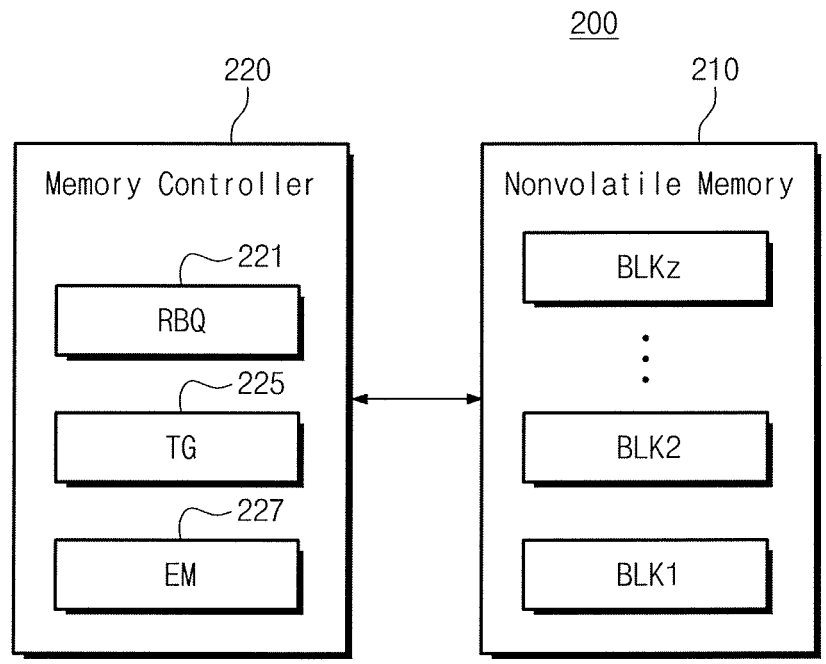
FIG. 7 is a block diagram schematically illustrating a memory system according to an exemplary embodiment of the inventive concept.

FIG. 7 is a block diagram schematically illustrating a memory system 200 according to an exemplary embodiment of the inventive concept. Referring to FIG. 7, a memory system 200 includes a nonvolatile memory 210 and a memory controller 220.

The nonvolatile memory 210 contains a plurality of memory blocks BLK1 to BLKz, which include free blocks, data blocks, invalid blocks, or erase blocks. The nonvolatile memory 210 is configured substantially the same as a nonvolatile memory 110 described with reference to FIGS. 1 to 7, and operates in the same method as the nonvolatile memory 110.

The memory controller 220 includes a reserved block queue 221, a time generator 225, and an erase manager 227.

The reserved block queue 221 manages reserved blocks (e.g., erase and invalid blocks) of the plurality of memory blocks BLK1 to BLKz. When an invalid block is produced by invalidating a data block, the invalid block may be registered at the reserved block queue 221. An erase block that is assigned to a free block may be deleted from the reserved block queue 221.

The time generator 225 generates information indicating a current time. For example, the time generator 225 may be a device that generates time information. The time generator 225 may include a crystal oscillator for generating current time. The time generator 225 may receive a clock signal and generate current time using the clock signal. The time generator may be a device that receives time information from an external device (e.g., host of a memory system 200) and outputs the time information. The current time may be real time associated with the real world (e.g., Greenwich Mean Time). The current time may be relative time limited to the memory system 200. For example, the memory system 200 being first started could be treated as time 0, and a current offset from this time 0 could be treated as the current time.

The erase manager 227 erases invalid blocks registered at the reserved block queue 221 to make erase blocks. When an erase block is produced by erasing an invalid block, the erase manager 227 acquires time information that the time generator 225 outputs. The time information acquired at an erase operation may be managed as a time stamp of an erase block. The erase manager 227 acquires time information from the time generator 225 in response to a request that informs of an assignment of an erase block to a free block. The time information acquired may be a current time. In an exemplary embodiment, based on the time stamp of the erase block and the current time, the erase manager 227 again erases the erase block or assigns it to a free block.

Figure 8:
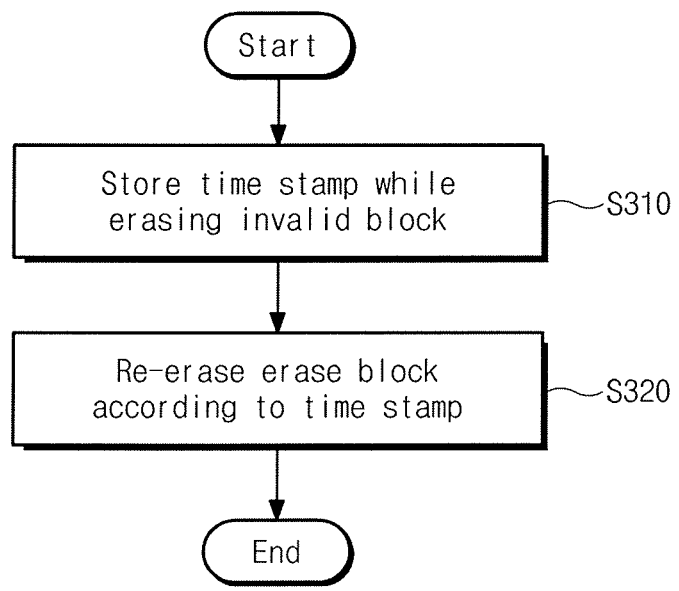
FIG. 8 is a flow chart schematically illustrating an operation method of a memory system according to an exemplary embodiment of the inventive concept.

FIG. 8 is a flow chart schematically illustrating an operation method of a memory system 200 according to an exemplary embodiment of the inventive concept. Referring to FIGS. 7 and 8, in step S310, a time stamp is stored while an invalid block is erased. For example, an erase manager 227 erases an invalid block registered at a reserved block queue 221 to make an erase block. When the invalid block is erased, the erase manager 227 receives time information from a time generator 225 and stores it as a time stamp of the erase block. For example, the time stamp may be stored in a memory controller 220 or a nonvolatile memory 210. The time stamp may be managed as metadata for managing an erase block.

In step S320, an erase block is again erased according to the time stamp. For example, the erase manager 227 may receive time information from the time generator 225 as a current time. The erase manager 227 compares a time stamp associated with a selected erase block with the time stamp. The erase manager 227 again erases the erase block selectively according to the comparison result.

Figure 9:
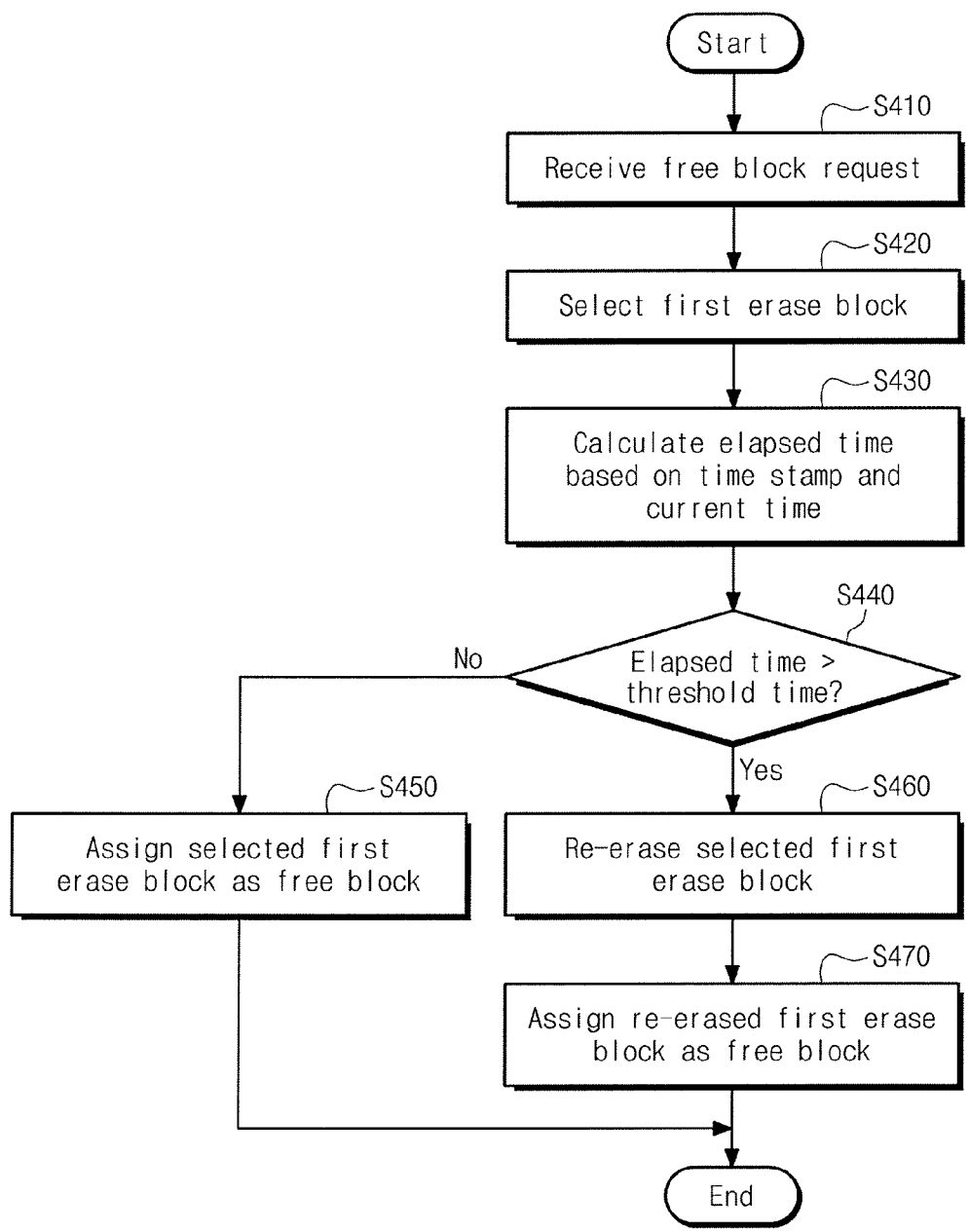
FIG. 9 is a flow chart schematically illustrating a method (S320) of re-erasing an erase block, according to an embodiment of the inventive concept.

FIG. 9 is a flow chart schematically illustrating a method (S320) of re-erasing an erase block, according to an exemplary embodiment of the inventive concept. Referring to FIGS. 7 to 9, in step S410, a free block request is received. For example, a memory controller 220 may issue a free block request according to a request of an external device (e.g., host of a memory system 200) or an internally generated request. In an exemplary embodiment, the internally generated request is a merge request. The merge request may be used to copy data written in one or more data blocks to a free block(s) and set the one or more data blocks to an invalid block(s). The issued request may be provided to an erase manager 227.

In step S420, a first erase block is selected (e.g., in response to the free block request). For example, the earliest erased one of several erase blocks of a reserved block queue 221 may be selected. The erase manager 227 may select the earliest erase block as the first erase block.

In step S430, an elapsed time is calculated based on a time stamp and a current time. The erase manager 227 may acquire the time stamp associated with the first erase block.

When a time stamp of the first erase block is stored in an internal memory of the memory controller 220, the erase manager 227 reads the time stamp from the internal memory. In contrast, when a time stamp of the first erase block is stored in a nonvolatile memory 210, the erase manager 227 reads the time stamp from the nonvolatile memory 210.

For example, time stamps of erase blocks may be managed as shown in the following table 1 (referred as an erase table 1 below).

TABLE 1

| Addresses of erase blocks | Time stamps |
| --- | --- |
| ADDR_BLK1 | T1 |
| ADDR_BKL2 | T2 |
| ADDR_BLK3 | T3 |

As shown in the erase table 1, a time stamp may be managed using a mapping relation with addresses of erase blocks. If an address of a first erase block is detected, a time stamp of the first erase block may be obtained based on the erase table 1. The erase table may be stored in the nonvolatile memory 210 at power-off and may be loaded into the memory controller 220 at power-on or at a point in time when the erase table is first required.

The erase manager 227 may acquire a current time from a time generator 225. The erase manager 227 compares the time stamp and the current time to calculate an elapsed time. The elapsed time may be a time, which elapses after the first erase block is erased, on the basis of a current time. The elapsed time may correspond to a difference between the current time and a time corresponding to the time stamp.

In step S440, whether the elapsed time is greater than a threshold time is determined. The threshold time may be a value that is input into the memory controller 220 when manufactured or that is input into the memory controller 220 after manufacture. The threshold time may be a value that is input into the nonvolatile memory 210 when manufactured or that is input into the nonvolatile memory 210 after manufacture. The threshold time may be a value that is decided according to characteristics of memory blocks BLK1 to BLKz of the nonvolatile memory 210. In an exemplary embodiment, the threshold time indicates a maximum elapsed time when a write or read error does not occur after the memory blocks BLK1 to BLKz of the nonvolatile memory 210 are erased. The threshold time may be decided by an external device or according to a signal that is received from the external device.

The erase manager 227 may acquire the threshold time in the memory controller 220 or from the nonvolatile memory 210. The erase manager 227 compares the elapsed time with the threshold time thus acquired.

The first erase block does not cause (or is not likely to cause) a write or read error when the elapsed time is below the threshold time. Thus, in step S450, the first erase block is assigned to a free block. For example, the first erase block may be assigned to a free block without a separate process (e.g., re-erasing).

The first erase block causes (or is likely to cause) a write or read error when the elapsed time is over the threshold time. Thus, in step S460, the first erase block is re-erased. In step S470, the re-erased first erase block is assigned to a free block.

Figure 10:
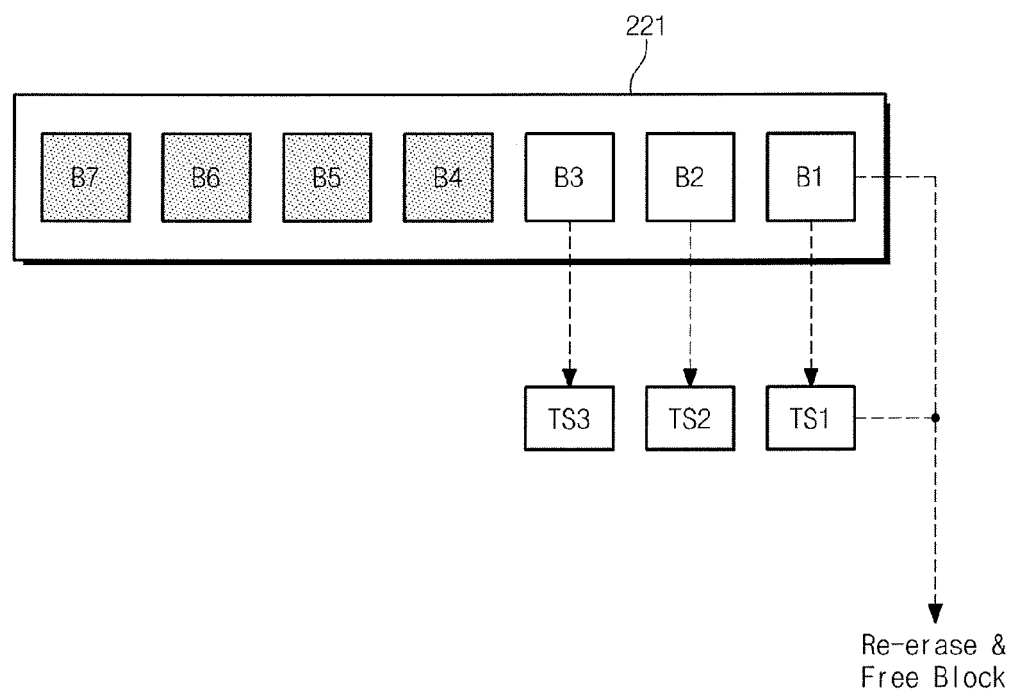
FIG. 10 is a diagram schematically illustrating an example in which an erase block is re-erased.

FIG. 10 is a diagram schematically illustrating an example in which an erase block is re-erased. Referring to FIGS. 7 to 10, seven memory blocks B1 to B7 are registered at a reserved block queue 221. In the reserved block queue 221, the set number of erase blocks may be 3. That is, three earliest registered memory blocks B1 to B3 of the memory blocks B1 to B7 registered at the reserved block queue 221 are erase blocks, and all the memory blocks B4 to B7 other than the memory blocks B1 to B3 are invalid blocks.

A first time stamp ST1 is generated when the first memory block B1 is erased, a second time stamp ST2 is generated when the second memory block B2 is erased, and a third time stamp ST3 is generated when the third memory block B3 is erased. The time stamps thus generated may be stored and managed in an erase time table.

When a free block is requested, the first time stamp TS1 of the first memory block B1 (e.g., a first erase block) is compared with a current time. If the comparison result indicates that a difference between the current time and the first time stamp TS1 (e.g., an elapsed time) is over a threshold time, then the first memory block B1 is erased. The first memory block B1 thus erased may be assigned to a free block.

Figure 11:
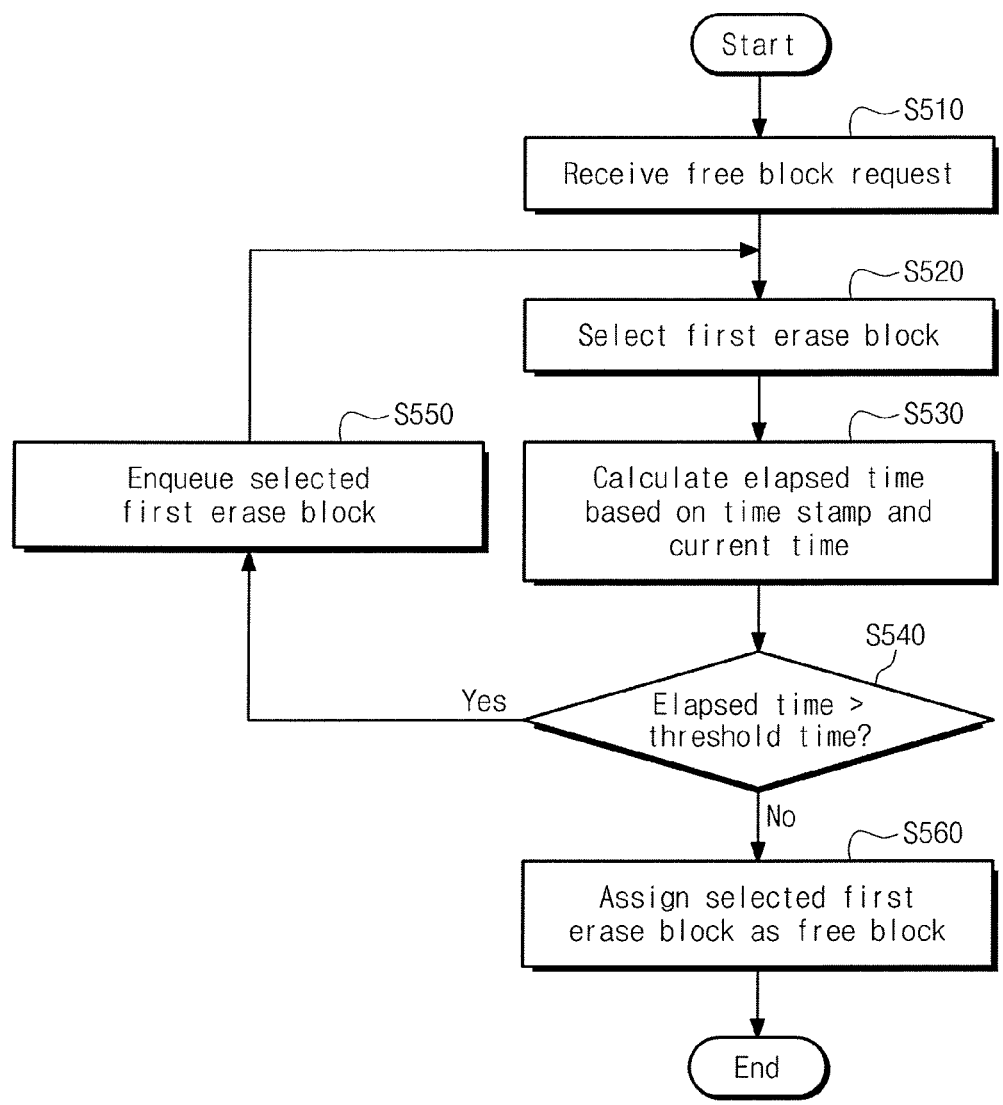
FIG. 11 is a flow chart schematically illustrating a method (S320) of re-erasing an erase block, according to an exemplary embodiment of the inventive concept.

FIG. 11 is a flow chart schematically illustrating a method (S320) of re-erasing an erase block, according to an exemplary embodiment of the inventive concept. Referring to FIGS. 7, 8, and 11, in step S510, a free block request is received. In step S520, a first erase block is selected (e.g., in response to the free block request). In step S530, an elapsed time is calculated based on a time stamp (e.g., of the first erase block) and a current time. In step S540, whether the elapsed time is over the threshold time is determined. Steps S510 to S540 are the same as steps S410 to S440 shown in FIG. 9, and a duplicated description is thus omitted.

The first erase block causes a write or read error when the elapsed time is over the threshold time. Thus, in step S550, the first erase block is enqueued at the reserved block queue 221. That is, after the first erase block is set to an invalid block, the first erase block is enqueued at the reserved block queue 221; therefore, an erase operation or an operation setting an invalid block to an erase block is made according to a control schedule of the erase manager 227. In step S520, a next erase block is selected, and then steps S530 and S540 are performed.

The first erase block does not cause a write or read error when the elapsed time is below the threshold time. Thus, in step S560, the first erase block is assigned to a free block.

Figure 12:
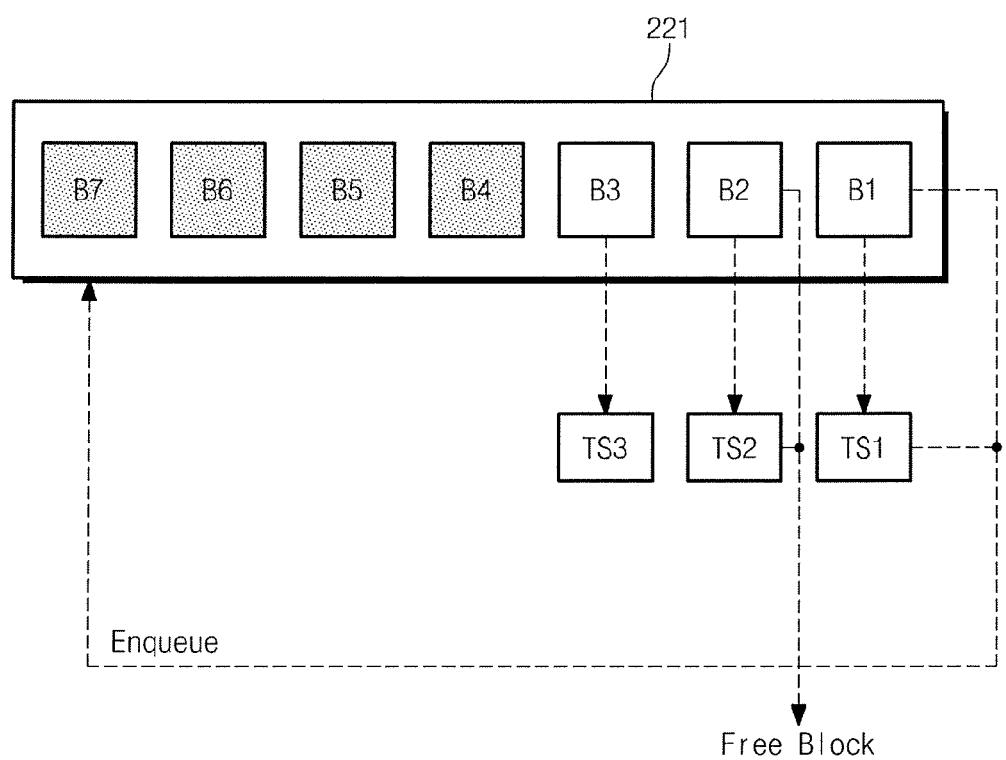
FIG. 12 is a diagram schematically illustrating an example in which an erase block is enqueued.

FIG. 12 is a diagram schematically illustrating an example in which an erase block is enqueued. Referring to FIGS. 7, 8, 11, and 12, seven memory blocks B1 to B7 are registered at a reserved block queue 221. In the reserved block queue 221, the set number of erase blocks may be 3. That is, three earliest registered memory blocks B1 to B3 of the memory blocks B1 to B7 registered at the reserved block queue 221 are erase blocks, and all the memory blocks B4 to B7 other than the memory blocks B1 to B3 are invalid blocks.

A first time stamp ST1 is generated when the first memory block B1 is erased, a second time stamp ST2 is generated when the second memory block B2 is erased, and a third time stamp ST3 is generated when the third memory block B3 is erased. The time stamps thus generated may be stored and managed in an erase time table.

When a free block is requested, the first time stamp TS1 of the first memory block B1 (e.g., a first erase block) is compared with a current time. If the comparison result indicates that a difference between the current time and the first time stamp TS1 (e.g., an elapsed time) is over a threshold time, then the first memory block B1 is enqueued at the reserved block queue 221.

Afterwards, a second memory block B2 is selected. The second time stamp TS2 of the second memory block B2 is compared with the current time. The second memory block B2 is assigned to a free block when the comparison result indicates that a difference between the current time and the second time stamp TS2, that is, an elapsed time is below the threshold time.

As described above, the erase manager 227 maintains erase blocks in the reserved block queue 221 as many as the set number. When a free block is requested, a time stamp of a selected erase block is compared with a current time. That is, whether a threshold time elapses after a selected erase block is erased is determined. If the threshold time has elapsed, the selected erase block is re-erased. Thus, the reliability of a memory system 200 is improved by preventing an error that occurs when an erase block leaves during a critical time.

Figure 13:
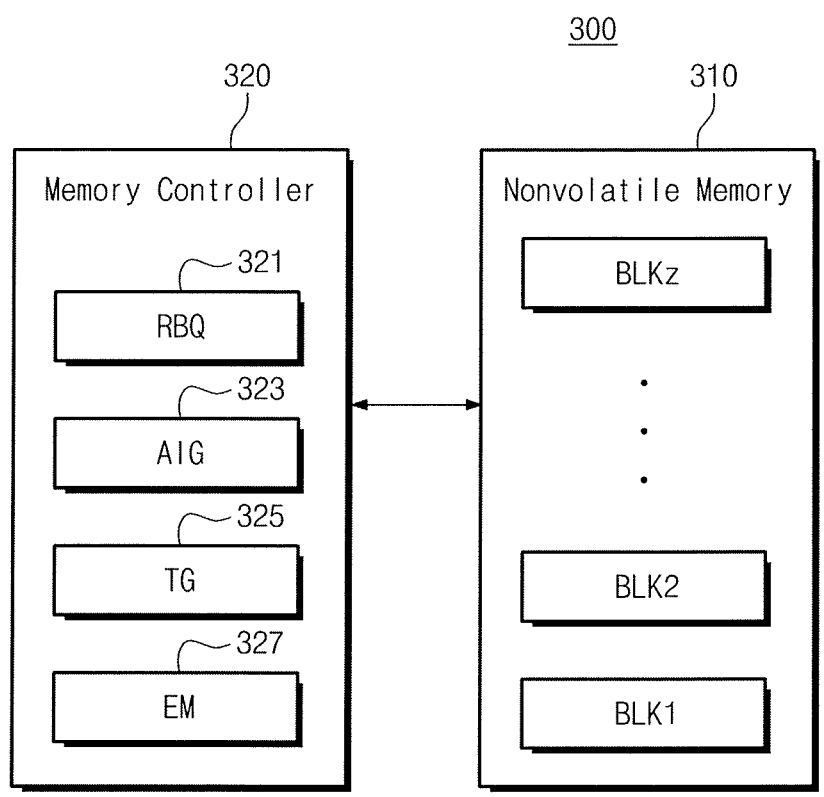
FIG. 13 is a block diagram schematically illustrating a memory system according to an exemplary embodiment of the inventive concept.

FIG. 13 is a block diagram schematically illustrating a memory system 300 according to still an exemplary embodiment of the inventive concept. Referring to FIG. 13, a memory system 300 contains a nonvolatile memory 310 and a memory controller 320.

The nonvolatile memory 310 is configured to perform read, write, and erase operations according to a control of the memory controller 320. The nonvolatile memory 310 contains a plurality of memory blocks BLK1 to BLKz.

The memory controller 320 is configured to control the nonvolatile memory 310. The memory controller 320 includes a reserved block queue 321, an assignment interval calculator 323, a time generator 325, and an erase manager 327.

The memory system 300 may be a combination of a memory system 100 described with reference to FIG. 1 and a memory system 200 described with reference to FIG. 7. That is, the memory system 300 may adjust the number of erase blocks maintained in the reserved block queue 321 (e.g., a set number) and perform re-erasing according to a time stamp and a current time of an erase block.

Figure 14:
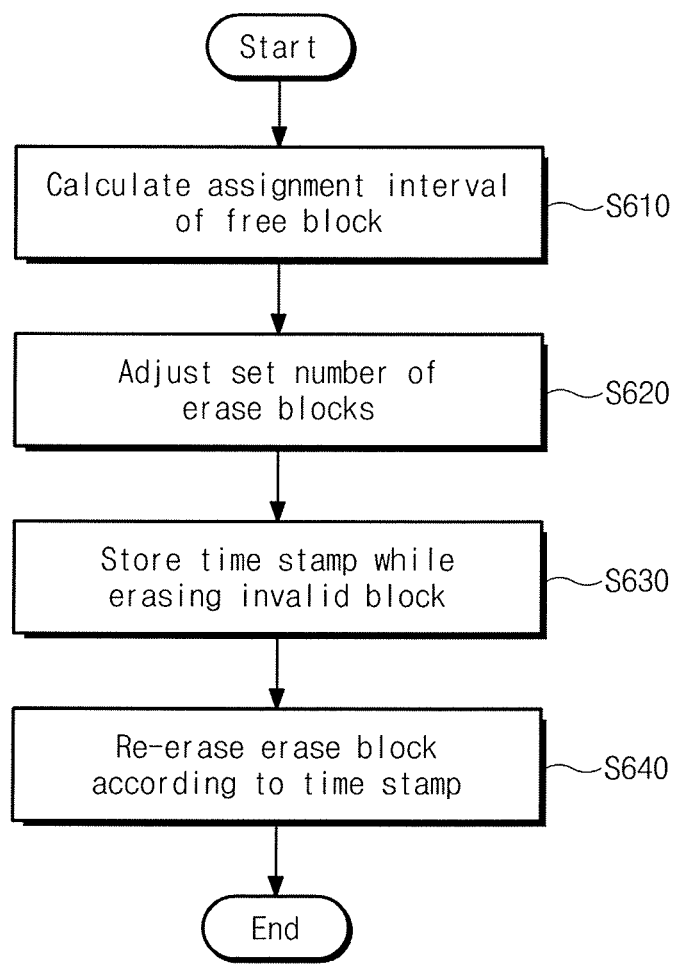
FIG. 14 is a flow chart schematically illustrating an operation method of a memory system according to an exemplary embodiment of the inventive concept.

FIG. 14 is a flow chart schematically illustrating an operation method of a memory system 300 according to an exemplary embodiment of the inventive concept. Referring to FIGS. 13 and 14, in step S610, an assignment interval of free blocks is calculated. An assignment interval calculator 323 calculates an assignment interval (e.g., average assignment interval) with which a predetermined number of free blocks is the most recently assigned.

In step S620, the set number of erase blocks is adjusted. For example, an erase manager 327 may adjust the set number according to the assignment interval. That is, the erase manager 327 may adjust the number of memory blocks, maintained as erase blocks, from among memory blocks in a reserved block queue 321. The set number may be adjusted according to a method described with reference to FIGS. 3 to 6.

In step S630, a time stamp is stored while an invalid block is erased. When an invalid block is erased, the erase manager 327 receives time information from a time generator 325 and stores it as a time stamp of an erase block.

In step S640, an erase block is re-erased according to the time stamp. For example, the erase manager 327 receives time information from the time generator 325 as a current time. The erase manager 327 compares a time stamp associated with a selected erase block with a current time. The erase manager 327 re-erases the selected erase block selectively according to the comparison result. Re-erasing may be performed according to a method described with reference to FIGS. 9 to 12.

That is, a memory system 300 may adjust the set number of erase blocks of the reserved block queue 321 according to an assignment interval with which free blocks are assigned. Also, when a free block is requested, an erase block is re-erased according to whether a time that elapses after a selected erase block is erased exceeds an elapsed time.

Figure 15:
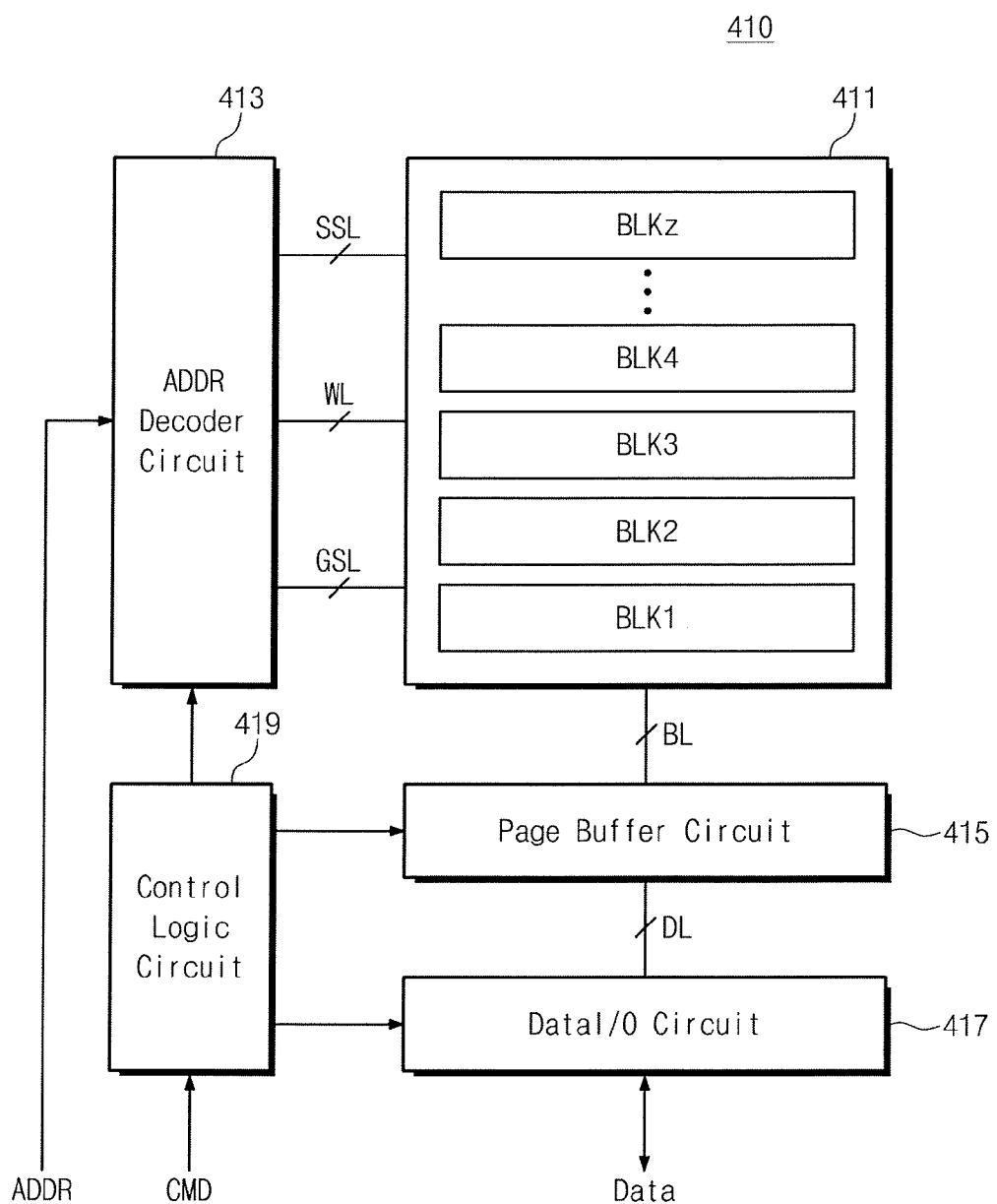
FIG. 15 is a block diagram schematically illustrating a nonvolatile memory according to an exemplary embodiment of the inventive concept.

FIG. 15 is a block diagram schematically illustrating a nonvolatile memory 410 according to an exemplary embodiment of the inventive concept. Referring to FIG. 15, a nonvolatile memory 410 includes a memory cell array 411, an address decoder circuit 413, a page buffer circuit 415, a data input/output circuit 417, and a control logic circuit 419.

As described with reference to FIGS. 1, 7, and 13, the memory cell array 411 includes a plurality of memory blocks BLK1 to BLKz, each of which has a plurality of memory cells. Each memory block is connected to the address decoder circuit 413 through at least one string selection line SSL, a plurality of word lines WL, and at least one ground selection line GSL. The memory cell array 411 is connected to the page buffer circuit 415 through a plurality of bit lines BL. The memory blocks BLK1 to BLKz may be connected in common to the plurality of bit lines BL. Memory cells of the memory blocks BLK1 to BLKz may have the same structure.

The address decoder circuit 413 is connected to the memory cell array 411 through a plurality of ground selection lines GSL, the plurality of word lines WL, and a plurality of string selection lines SSL. The address decoder circuit 413 operates according to a control of the control logic circuit 419. The address decoder circuit 413 may receive an input address ADDR from a memory controller 120. The address decoder circuit 413 decodes the input address ADDR and controls voltages to be applied to the word lines WL according to the decoded address.

The page buffer circuit 415 is connected to the memory cell array 411 through the bit lines BL. The page buffer circuit 415 is connected to the data input/output circuit 417 through a plurality of data lines DL. The page buffer circuit 415 operates according to a control of the control logic circuit 419.

The page buffer circuit 415 holds data to be programmed at memory cells of the memory cell array 411 or data read from memory cells thereof. During a program operation, the page buffer circuit 415 stores data to be stored in memory cells. The page buffer circuit 415 biases the plurality of bit lines BL based on the stored data. The page buffer circuit 415 functions as a write driver at a program operation. During a read operation, the page buffer circuit 415 senses voltages on the bit lines BL and stores sensing results. The page buffer circuit 415 functions as a sense amplifier at a read operation.

The data input/output circuit 417 is connected to the page buffer circuit 415 through the data lines DL. The data input/output circuit 417 exchanges data with the memory controller 120, 220, or 320 (refer to FIG. 1, 7, or 13).

The data input/output circuit 417 temporarily stores input data to transfer it to the page buffer circuit 215. The data input/output circuit 417 temporarily stores data transferred from the page buffer circuit 415 to transfer it to an external device. The data input/output circuit 417 functions as a buffer memory.

The control logic circuit 419 receives a command CMD from the memory controller. The control logic circuit 419 decodes the received command CMD and controls an overall operation of the nonvolatile memory 410 according to the decoded command. The control logic circuit 419 further receives a variety of control signals and voltages from the memory controller.

A set number may be stored in the nonvolatile memory 410. For example, the set number may be stored in one memory block (e.g., as metadata) from among the memory blocks BLK1 to BLKz. The set number may be stored in a fuse circuit (not shown) that is included in the control logic circuit 419.

Time stamps of the memory blocks BLK1 to BLKz may be stored in the nonvolatile memory 410. For example, the time stamps may be stored in one memory block (e.g., as metadata) from among the memory blocks BLK1 to BLKz. A time stamp may be stored in a memory block corresponding thereto. For example, a time stamp of a first memory block BLK1 may be stored in memory cells (e.g., as metadata) from among memory cells of the first memory block BLK1.

Figure 16:
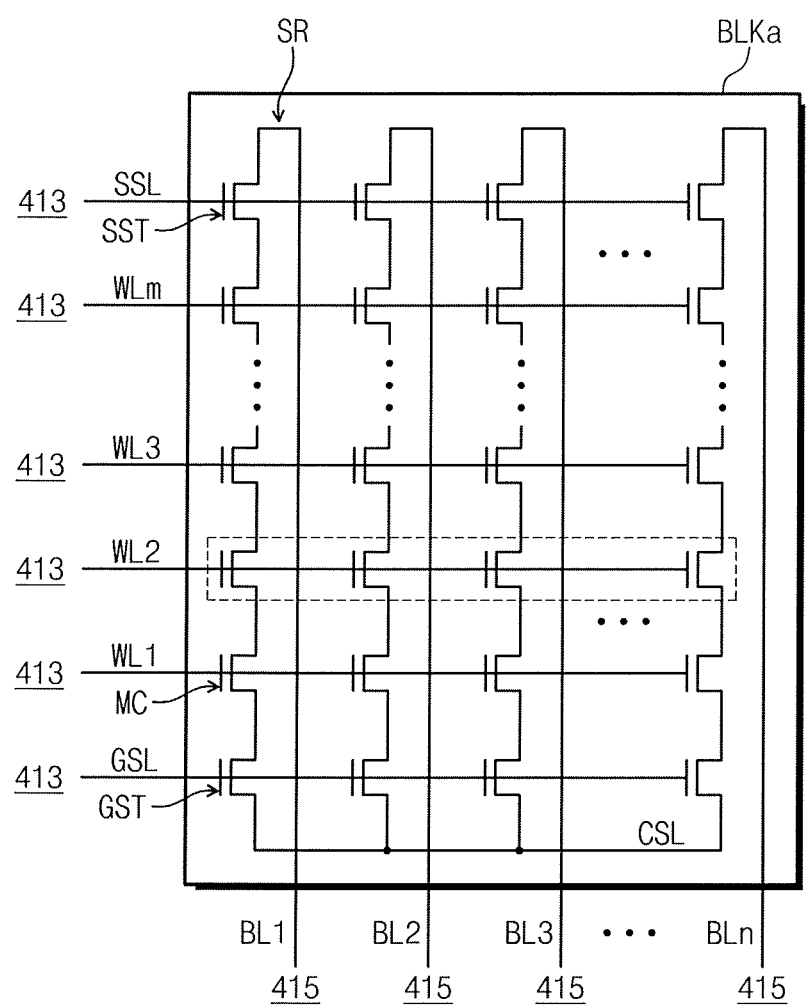
FIG. 16 is a circuit diagram schematically illustrating a memory block according to an exemplary embodiment of the inventive concept.

FIG. 16 is a circuit diagram schematically illustrating a memory block BLKa according to an exemplary embodiment of the inventive concept. In FIG. 16, there is illustrated one BLKa of a plurality of memory blocks BLK1 to BLKz of a memory cell array 411 shown in FIG. 15.

Referring to FIGS. 15 and 16, a memory block BLKa includes a plurality of strings SR, which are connected to a plurality of bit lines BL1 to BLn, respectively. Each string SR contains a ground selection transistor GST, memory cells MC, and a string selection transistor SST.

In each string SR, the ground selection transistor GST is connected between the memory cells MC and a common source line CSL. The ground selection transistors GST of the strings SR are connected in common to the common source line CSL.

In each string SR, the string selection transistor SST is connected between the memory cells MC and a bit line BL. The string selection transistors SST of the strings SR are connected to a plurality of bit lines BL1 to BLn, respectively. The bit lines BL1 to BLn may be connected to a page buffer circuit 415.

In each string SR, the plurality of memory cells MC are connected between the ground selection transistor GST and the string selection transistor SST. In each string SR, the plurality of memory cells MC are connected in series.

In an exemplary embodiment, in the strings SR, memory cells MC having the same height from the common source line CSL are connected in common to a word line. The memory cells MC of the strings SR are connected to a plurality of word lines WL1 to WLm. The word lines WL1 to WLm may be connected to an address decoder circuit 413. A memory cell MC stores one or more bits.

Figure 17:
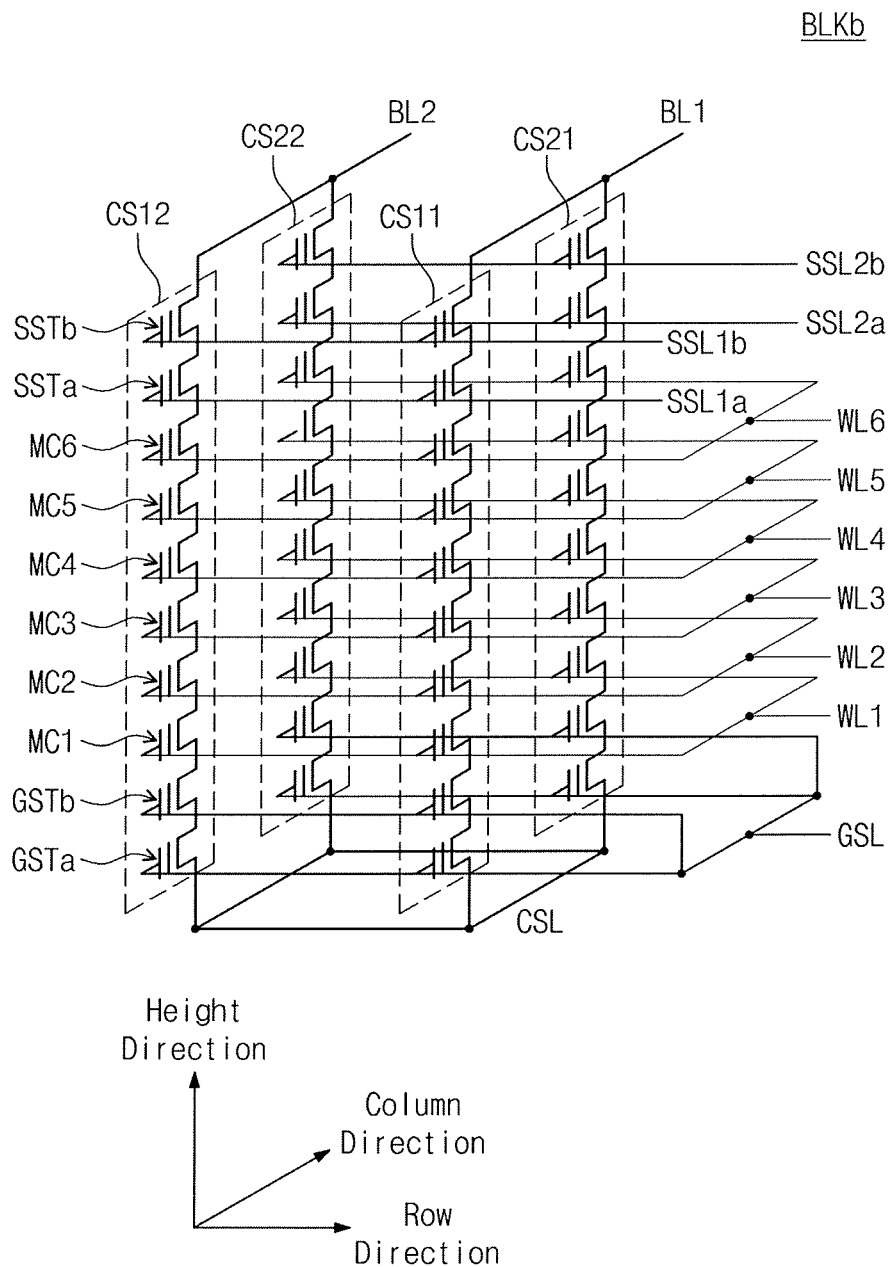
FIG. 17 is a circuit diagram schematically illustrating a memory block according to an exemplary embodiment of the inventive concept.

FIG. 17 is a circuit diagram schematically illustrating a memory block BLKb according to an exemplary embodiment of the inventive concept. Referring to FIG. 17, a memory block BLKb includes a plurality of cell strings CS11 to CS21 and CS12 to CS22. The plurality of cell strings CS11 to CS21 and CS12 to CS22 are arranged along a row direction and a column direction and form rows and columns.

For example, the cell strings CS11 and CS12 arranged along the row direction form a first row, and the cell strings CS21 and CS22 arranged along the row direction form a second row. The cell strings CS11 and CS21 arranged along the column direction form a first column, and the cell strings CS12 and CS22 arranged along the column direction form a second column.

Each cell string includes a plurality of cell transistors. The cell transistors may be a charge trap type cell transistor. That is, the cell transistors may be programmed when charge is trapped in their insulation layers and erased when charge is discharged therefrom.

The cell transistors include ground selection transistors GSTa and GSTb, memory cells MC1 to MC6, and string selection transistors SSTa and SSTb. The ground selection transistors GSTa and GSTb, memory cells MC1 to MC6, and string selection transistors SSTa and SSTb of each cell string are stacked in a height direction perpendicular to a plane (e.g., plane above a substrate of the memory block BLKb) on which the cell strings CS11 to CS21 and CS12 to CS22 are arranged along rows and columns.

Lowermost ground selection transistors GSTa are connected in common to a common source line CSL. The ground selection transistors GSTa and GSTb of the plurality of cell strings CS11 to CS21 and CS12 to CS22 are connected in common to a ground selection line GSL.

In an exemplary embodiment, ground selection transistors with the same height (or, order) are connected to the same ground selection line, and ground selection transistors with different heights (or, orders) are connected to different ground selection lines. For example, the ground selection transistors GSTa with a first height are connected in common to a first ground selection line, and the ground selection transistors GSTb with a second height are connected in common to a second ground selection line.

In an exemplary embodiment, ground selection transistors in the same row are connected to the same ground selection line, and ground selection transistors in different rows are connected to different ground selection lines. For example, the ground selection transistors GSTa and GSTb of the cell strings CS11 and CS12 in the first row are connected in common to the first ground selection line, and the ground selection transistors GSTa and GSTb of the cell strings CS21 and CS22 in the second row are connected in common to the second ground selection line.

Memory cells that are placed at the same height (or, order) from the substrate (or, the ground selection transistors GST) are commonly connected to a same word line. Memory cells that are placed at different heights (or, orders) are connected to different word lines WL1 to WL6. For example, the memory cells MC1 are connected in common to the word line WL1, the memory cells MC2 are connected in common to the word line WL2, and the memory cells MC3 are connected in common to the word line WL3. The memory cells MC4 are connected in common to the word line WL4, the memory cells MC5 are connected in common to the word line WL5, and the memory cells MC6 are connected in common to the word line WL6.

In first string selection transistors SSTa, having the same height (or, order), of the cell strings CS11 to CS21 and CS12 to CS22, the first string selection transistors SSTa in different rows are connected to different string selection lines SSL1a and SSL2a. For example, the first string selection transistors SSTa of the cell strings CS11 and CS12 are connected in common to the string selection line SSL1a, and the first string selection transistors SSTa of the cell strings CS21 and CS22 are connected in common to the string selection line SSL2a.

In second string selection transistors SSTb, having the same height (or, order), of the cell strings CS11 to CS21 and CS12 to CS22, the second string selection transistors SSTb in different rows are connected to the different string selection lines SSL1b and SSL2b. For example, the second string selection transistors SSTb of the cell strings CS11 and CS12 are connected in common to the string selection line SSL1b, and the second string selection transistors SSTb of the cell strings CS21 and CS22 are connected in common to the string selection line SSL2b.

That is, cell strings in different rows may be connected to different strings selection lines. String selection transistors, having the same height (or, order), of cell strings in the same row are connected to the same string selection line. String selection transistors, having different heights (or, orders), of cell strings in the same row are connected to different string selection lines.

In an exemplary embodiment, string selection transistors of cell strings in the same row are connected in common to a string selection line. For example, string selection transistors SSTa and SSTb of cell strings CS11 and CS12 in the first row are connected in common to a string selection line, and string selection transistors SSTa and SSTb of cell strings CS21 and CS22 in the second row are connected in common to a string selection line.

Columns of the cell strings CS11 to CS21 and CS12 to CS22 are connected to different bit lines BL1 and BL2, respectively. For example, string selection transistors SSTb of the cell strings CS11 and CS21 in the first column are connected in common to the bit line BL1, and string selection transistors SSTb of the cell strings CS12 and CS22 in the second column are connected in common to the bit line BL2.

The memory block BLKb shown in FIG. 17 is exemplary. However, the inventive concept is not limited thereto. For example, the number of rows of cell strings may increased or decreased. As the number of rows of cell strings is changed, the number of string or ground selection lines and the number of cell strings connected to a bit line may also be changed.

The number of columns of cell strings may increase or decrease. As the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In an exemplary embodiment, a write and a read operation are performed by the row. For example, the cell strings CS11 to CS21 and CS12 to CS22 may be selected by the row through the string selection lines SSL1a, SSL1b, SSL2a, and SSL2b.

In a selected row of cell strings CS11 to CS21 and CS12 to CS22, a write or a read operation may be performed by the word line. In a selected row of cell strings CS11 to CS21 and CS12 to CS22, memory cells connected to a selected word line may be programmed.

As compared with a memory block BLKa shown in FIG. 16, the memory block BLKb has a structure in which selection transistors and cell transistors are stacked in a height direction. Since the number of memory cells in the memory block BLKb may be more than that in the memory block BLKa, a time taken to erase the memory block BLKb may be longer than a time taken to erase the memory block BLKa. Likewise, a time taken to verify the memory block BLKb may be longer than a time taken to verify the memory block BLKa. That is, the inventive concept may be of more use in a stacked structure of memory block (shown in FIG. 17) because erase blocks corresponding to the set number are previously prepared.

Figure 18:
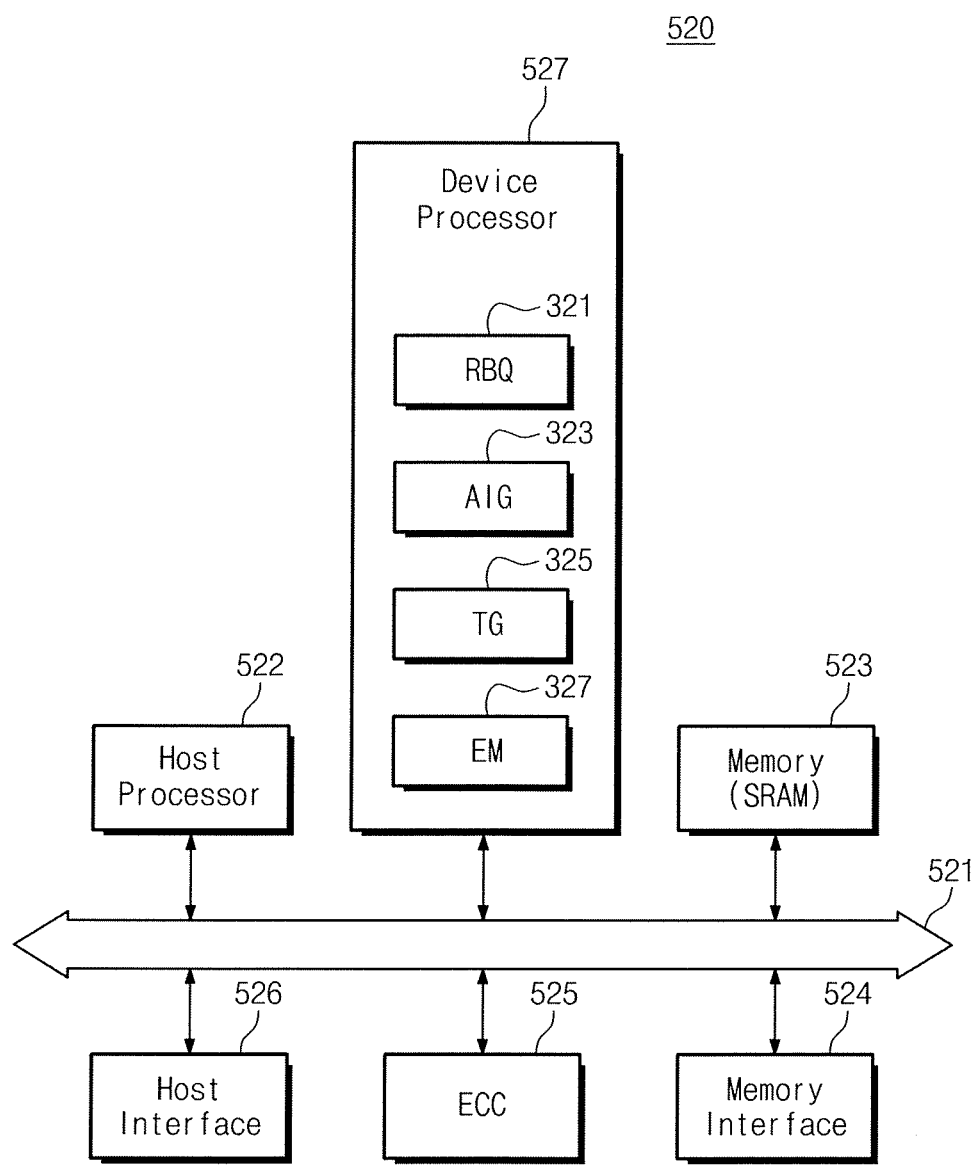
FIG. 18 is a block diagram schematically illustrating a memory controller according to an exemplary embodiment of the inventive concept.

FIG. 18 is a block diagram schematically illustrating a memory controller 520 according to an exemplary embodiment of the inventive concept. Referring to FIG. 18, a memory controller 520 contains a bus 521, a host processor 522, a memory 523, a memory interface 524, an ECC block 525, a host interface 526, and a device processor 527.

The bus 521 may be configured to provide a channel for communication among components of the memory controller 220.

The host processor 522 communicates with an external host. The host processor 522 processes commands or data that the external device provides. The host processor 522 stores commands or data input via the host interface 526 from the external host in the memory 523 and transfers a control on the stored commands or data to the device processor 527. The host processor 522 outputs data stored in the memory 523 to the external host via the host interface 526. The host processor 522 controls an overall operation associated with the external host.

The memory 523 may be used as a working memory, a cache memory, or a buffer memory of the host processor 522. The memory 523 stores codes or instructions that the host processor 522 will execute. The memory 523 stores data processed by the host processor 522. The memory 523 may include an SRAM.

The memory interface 524 communicates with a nonvolatile memory 410 according to a control of the host processor 522.

The ECC block 525 performs error correction. The ECC block 525 generates parities for error correction based on data to be written into the nonvolatile memory 410. The nonvolatile memory 510 stores data and parities sent through the memory interface 524. The ECC block 525 corrects an error of data using data and parities read from the nonvolatile memory 410 through the memory interface 524.

The host interface 526 communicates with the external host according to a control of the host processor 522. The host interface 526 may communicate using at least one of various communication manners such as SATA (Serial AT Attachment), eSATA, PCI (Peripheral Component Interconnect), PCI-e, SCSI (Small Computer System Interface), USB (Universal Serial Bus), Mini USB, Micro USB, Firewire, NVMe, and so on.

The device processor 527 controls communication with the nonvolatile memory 410. The device processor 527 transfers an internal command to the nonvolatile memory 410 via the memory interface 524, based on a command stored in the memory 523. The device processor 527 transfers data stored in the memory 523 to the nonvolatile memory 410 via the memory interface 524. The device processor 527 stores data received from the nonvolatile memory 410 via the memory interface 524 in the memory 523. The device processor 527 transfers a control on data stored in the memory 523 to the host processor 522. The device processor 527 controls an overall operation associated with the nonvolatile memory 410.

The device processor 527 manages erasing memory blocks BLK1 to BLKz of the nonvolatile memory 410. The device processor 527 contains a reserved block queue 321, an assignment interval calculator 323, a time generator 325, and an erase manager 327. The components 321 to 327 have been described in detail with reference to FIGS. 1 to 14, and a description thereof is thus omitted.

As described with reference to FIGS. 1 to 6, the time generator 325 may be omitted from the device processor 527. When the time generator 325 is omitted, the device processor 527 supports a function of adjusting a set number of erase blocks, but it does not support a function of performing re-erasing an erase block according to a time stamp. As another example, as described with reference to FIGS. 7 to 12, the assignment interval calculator 323 may be omitted from the device processor 527. When the assignment interval calculator 323 is omitted, the device processor 527 supports a function of performing re-erasing an erase block according to a time stamp, but it does not support a function of adjusting a set number of erase blocks.

In an exemplary embodiment, the reserved block queue 321, assignment interval calculator 323, time generator 325, and erase manager 327 are all implemented by software that is driven on the device processor 527. In an exemplary embodiment, the reserved block queue 321, assignment interval calculator 323, time generator 325, and erase manager 327 are all implemented by hardware. In an exemplary embodiment, at least one of the reserved block queue 321, assignment interval calculator 323, time generator 325, and erase manager 327 is implemented with hardware, and at least one of all the components other than the hardware-implemented component is implemented by software.

Figure 19:
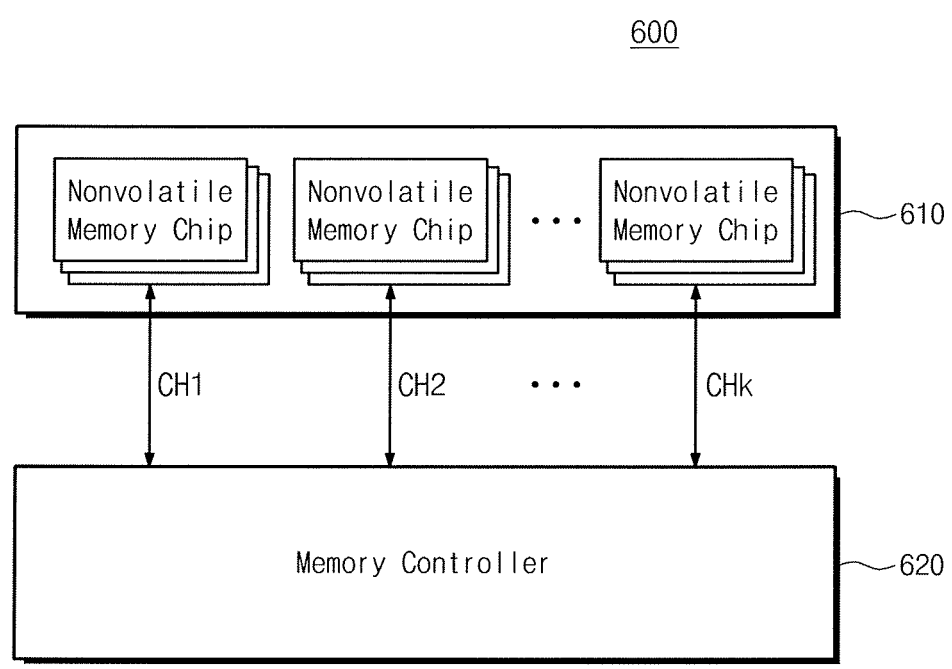
FIG. 19 is a block diagram illustrating a memory system according to an exemplary embodiment of the inventive concept.

FIG. 19 is a block diagram illustrating a memory system 600 according to an exemplary embodiment of the inventive concept. Referring to FIG. 19, a memory system 600 includes a nonvolatile memory 610 and a memory controller 620. The nonvolatile memory 610 includes a plurality of nonvolatile memory chips, which form a plurality of groups. Nonvolatile memory chips in each group may be configured to communicate with the memory controller 620 via one common channel. In an exemplary embodiment, the plurality of nonvolatile memory chips communicate with the memory controller 620 via a plurality of channels CH1 to CHk.

In FIG. 19, there is described an example where one channel is connected to a plurality of nonvolatile memory chips. However, the memory system 600 can be modified such that one channel is connected to one nonvolatile memory chip.

Figure 20:
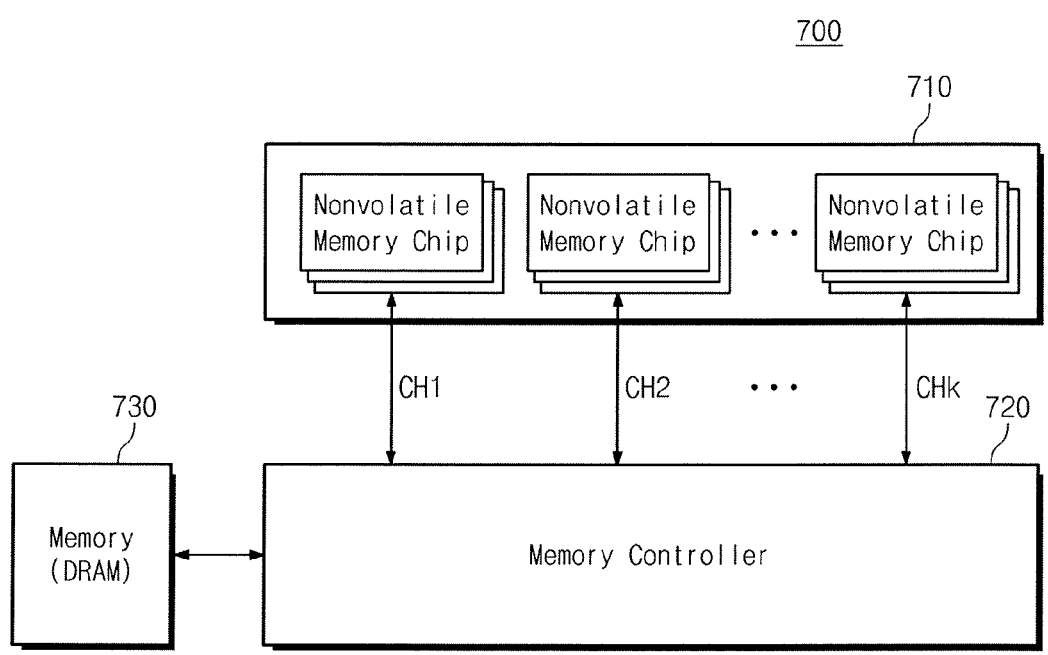
FIG. 20 is a block diagram schematically illustrating a memory system according to exemplary embodiment of the inventive concept.

FIG. 20 is a block diagram schematically illustrating a memory system 700 according to an exemplary embodiment of the inventive concept. Referring to FIG. 20, a memory system 700 contains a nonvolatile memory 710, a memory controller 720, and a memory 730. The memory system 700 is different from a memory system 600 of FIG. 19 since it further includes the memory 730.

The memory 730 may be a buffer memory of the memory system 700. For example, the memory controller 720 temporarily stores data received from an external host in the memory 730. Data stored in the memory 730 may be written in the nonvolatile memory 710. The memory controller 720 temporarily stores data read from the nonvolatile memory 710 in the memory 730. Data stored in the memory 730 is output to an external device or rewritten in the nonvolatile memory 710. The memory 730 may be a DRAM.

In exemplary embodiments, memory systems according to embodiments of the inventive concept form a Solid State Drive (SSD).

Memory systems according to exemplary embodiments of the inventive concept form a storage module such as a memory card or an embedded memory. Memory systems according to exemplary embodiments of the inventive concept form a variety of storage modules such as, but not limited to, PC (PCMCIA) card, CF card, SM (or, SMC) card, memory stick, multimedia card (MMC, RS-MMC, MMC-micro), security card (SD, miniSD, microSD, SDHC), universal flash storage (UFS) module, eMMC (embedded MMC) module, and the like.

Figure 21:
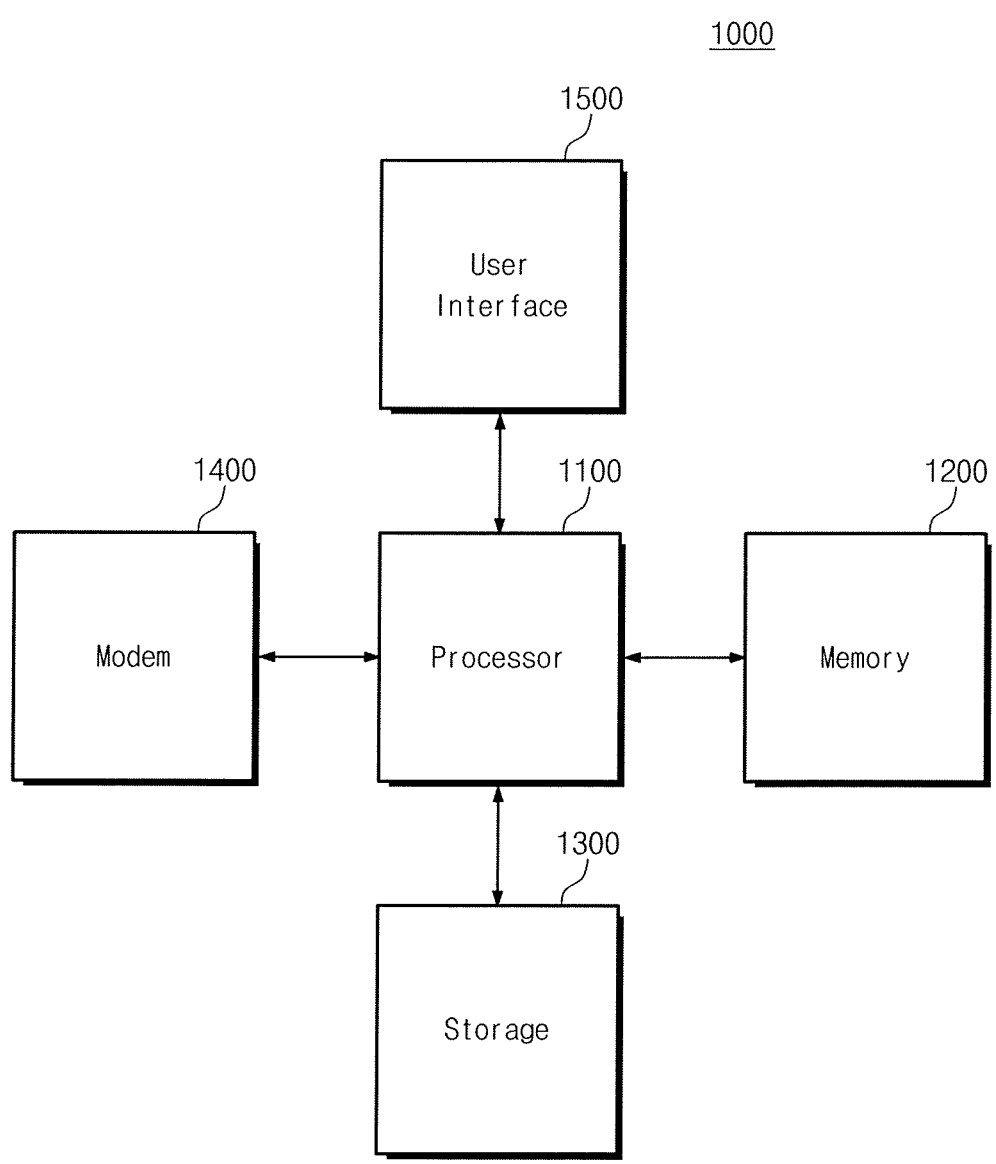
FIG. 21 is a block diagram schematically illustrating a computing device according to an exemplary embodiment of the inventive concept.

FIG. 21 is a block diagram schematically illustrating a computing device 1000 according to an exemplary embodiment of the inventive concept. Referring to FIG. 21, a computing device 1000 includes a processor 1100, a memory 1200, storage 1300, a modem 1400, and a user interface 1500.

The processor 1100 controls an overall operation of the computing device 1000 and performs a logical operation. The processor 1100 is formed of a system-on-chip (SoC). The processor 1100 may be a general purpose processor used in a personal computer, a specific-purpose processor used in a specific-purpose computer, or an application processor used in a mobile computing device.

The memory 1200 communicates with the processor 1100. The memory 1200 may be a working memory of the processor 1100 or the computing device 1000. The processor 1100 stores codes or data temporarily. The processor 1100 executes codes using the memory 1200 to process data. The processor 1100 executes a variety of software, such as, but not limited to, an operating system and an application, using the memory 1200. The processor 1100 controls an overall operation of the computing device 1000 using the memory 1200. The memory 1200 may include a volatile memory such as, but not limited to, a static RAM, a dynamic RAM, a synchronous DRAM, and so on or a nonvolatile memory such as, but not limited to, a flash memory, a Phase-change RAM (PRAM), a Magnetic RAM (MRAM), a Resistive RAM (RRAM), a Ferroelectric RAM (FRAM), and so on. The memory 1200 is a random access memory.

The storage 1300 communicates with the processor 1100. The storage 1300 is used to store data for a long time. That is, the processor 1100 stores data, which is to be stored for a long time, in the storage 1300. The storage 1300 stores a boot image for driving the computing device 1000. The storage 1300 stores source codes of a variety of software, such as an operating system and an application. The storage 1300 stores data that is processed by a variety of software, such as an operating system and an application.

In an exemplary embodiment, the processor 1100 drives a variety of software, such as an operating system and an application, by loading source codes stored in the storage 1300 onto the memory 1200 and executing codes loaded onto the memory 1200. The processor 1100 loads source codes stored in the storage 1300 onto the storage 1300 and process data loaded onto the memory 1200. The processor 1100 stores data for a long time of data stored in the memory 1200.

The storage 1300 includes a nonvolatile memory, such as, but not limited to, a flash memory, a PRAM (Phase-change RAM), an MRAM (Magnetic RAM), an RRAM (Resistive RAM), an FRAM (Ferroelectric RAM), and so on.

The storage 1300 may include memory systems according to embodiments of the inventive concept. For example, the storage 1300 may adjust a set number (e.g., the number of memory blocks to be maintained as erase blocks) according to an assignment interval of free blocks. The storage 1300 may re-erase an erase block based on a time stamp of the erase block.

The modem 1400 communicates with an external device according to a control of the processor 2100. For example, the modem 1400 communicates with the external device in a wired or wireless manner. The modem 1400 may communicate with the external device, based on at least one of several wireless communication protocols such as LTE (Long Term Evolution), WiMax, GSM (Global System for Mobile communication), CDMA (Code Division Multiple Access), Bluetooth, NFC (Near Field Communication), WiFi, RFID (Radio Frequency Identification, and so on or wired communication protocols such as USB (Universal Serial Bus), SATA (Serial AT Attachment), SCSI (Small Computer Small Interface), Firewire, PCI (Peripheral Component Interconnection), and so on.

The user interface 1500 communicates with a user according to a control of the processor 1100. For example, the user interface 1500 may include user input interfaces such as a keyboard, a keypad, a button, a touch panel, a touch screen, a touch pad, a touch ball, a camera, a microphone, a gyroscope sensor, a vibration sensor, and so on. The user interface 1500 may further include user output interfaces such as an LCD (liquid crystal display), an OLED (Organic Light Emitting Diode) display device, an AMOLED (Active Matrix OLED) display device, an LED, a speaker, a motor, and so on.

The computing device 1000 may be a mobile computing device, such as, but not limited to, a smart phone, a smart pad (e.g., a tablet computer), or a smart camera. The computing device 1000 may be a device, such as, but not limited to, a personal computer, a notebook computer, or a smart television.

While the inventive concept has been described with reference to exemplary embodiments, it will be apparent to those skilled in the art that various changes and modifications may be made without departing from the spirit and scope of the present inventive concept. Therefore, it should be understood that the above embodiments are not limiting, but illustrative.

What is claimed is:

1. A method of operating a nonvolatile memory (NVM) of a memory system, the method comprising:
    calculating, by a memory controller of the memory system, an assignment interval between successive assignments of erase blocks to free blocks from among a plurality of memory blocks of the NVM; and
    adjusting, by the memory controller, a number of erase blocks of the plurality of memory blocks according to the assignment interval, wherein the erase blocks are memory blocks, having an erased state, from among the plurality of memory blocks, and
    wherein the free blocks are memory blocks, which are selected to write data, from among the erase blocks.

2. The method of claim 1, wherein the assignment interval is calculated from a predetermined number of most recent assignments of the free blocks.

3. The method of claim 1, wherein the adjusting decreases the number of the erase blocks according to an increase in the assignment interval, wherein the adjusting increases the number of the erase blocks according to a decrease in the assignment interval.

4. The method of claim 1, further comprising: storing a time stamp when an invalid block is erased to generate an erase block, wherein the invalid block is a memory block, which stores invalid data and is generated by invalidating a data block, from among the plurality of memory blocks, and wherein the time stamp indicates a time when the erase block is generated.

5. The method of claim 4, further comprising: re-erasing the erase block according to the time stamp, wherein the erase block is re-erased when a difference between a time, indicated by the time stamp, and a current time is over a threshold value.

6. The method of claim 5, wherein the current time indicates a time when a request of an assignment of an erase block to a free block has been issued.

7. The method of claim 6, wherein the re-erased erase block is assigned to the free block according to the request.

8. The method of claim 6, wherein an erase block different from the re-erased erase block is assigned to the free block according to the request.

9. The method of claim 1, wherein each memory block includes vertically stacked memory cells, each memory cell being a charge trap type.

10. The method of claim 1, further comprising:
maintaining erase blocks corresponding to the number of erase blocks; and
selecting one of the erase blocks as a free block to write data into the free block.

11. A method of operating a nonvolatile memory (NVM) of a memory system, the method comprising:
storing, by a memory controller of the memory system, a time stamp at which an invalid block has been erased to generate an erase block; and
enqueuing, by the memory controller, the erase block into a reserved block queue when a difference between a time, indicated by the time stamp and a current time is greater than a threshold value,
wherein the invalid block is a memory block, which stores invalid data, from among the plurality of memory blocks, and wherein the erase block is a memory block, having an erased state, from among the plurality of memory blocks,
wherein the reserved block queue is configured to hold a number of erase blocks adjusted according to an assignment interval with which free blocks are assigned.

12. The method of claim 11, further comprising assigning the erase block to the free block when the difference is not greater than the threshold value.

13. The method of claim 11, wherein the current time indicates a time when a request indicating an assignment of the erase block to the free block has issued, and wherein the free block is a memory block, which does not currently store data and is selected to subsequently store data, from among erase blocks of the plurality of memory blocks.

14. The method of claim 13, wherein the erase block is assigned to the free block according to the request.

15. The method of claim 11, wherein the time stamp is mapped so as to be stored together with an address of the erase block.

16. The method of claim 11, wherein each memory block includes vertically stacked memory cells, each memory cell being a charge trap type.

17. The method of claim 11, further comprising:
erasing a reserved block in the reserved block queue to generate the erase block.

18. A method of operating a nonvolatile memory (NVM) of a memory system, the method comprising:
selecting, by a memory controller of the memory system, a current erase block from among a plurality of erase blocks in response to a request for a free block;
calculating, by the memory controller, an elapsed time based on a timestamp associated with the currently selected erase block;
enqueuing, by the memory controller, the currently selected erase block into a reserved block queue when the elapsed time is greater than a threshold; and
assigning, by the memory controller, the selected erase block as the free block when the elapsed time does not exceed the threshold time,
wherein the erase blocks are memory blocks, having an erased state, from among a plurality of memory blocks of the NVM, and wherein the free block is a memory block, which is selected to write data, from among the erase blocks,
wherein the reserved block queue is configured to hold a number of erase blocks adjusted according to an assignment interval with which free blocks are assigned.

19. The method of claim 18, wherein the timestamp is a time at which an invalid block storing invalid data is erased to generate the currently selected erase block.

20. The method of claim 18, further comprising:
after the enqueuing, again performing the selecting and the calculating, and performing one of the enqueuing and the assigning according to the elapsed time.

* * * * *